US010615620B2

(12) United States Patent
Mikami et al.

(10) Patent No.: US 10,615,620 B2
(45) Date of Patent: Apr. 7, 2020

(54) CHARGING SYSTEM AND CHARGING CABLE FOR PORTABLE TERMINAL DEVICE

(71) Applicant: NEC Platforms, Ltd., Kawasaki-shi, Kanagawa (JP)

(72) Inventors: Hayato Mikami, Kanagawa (JP); Masaya Matsumura, Kanagawa (JP)

(73) Assignee: NEC Platforms, Ltd., Kawasaki-shi, Kanagawa (JP)

( * ) Notice: Subject to any disclaimer, the term of this patent is extended or adjusted under 35 U.S.C. 154(b) by 35 days.

(21) Appl. No.: 15/777,283

(22) PCT Filed: Aug. 26, 2016

(86) PCT No.: PCT/JP2016/003891
§ 371 (c)(1),
(2) Date: May 18, 2018

(87) PCT Pub. No.: WO2017/090217
PCT Pub. Date: Jun. 1, 2017

(65) Prior Publication Data
US 2018/0331549 A1    Nov. 15, 2018

(30) Foreign Application Priority Data
Nov. 24, 2015    (JP) .................. 2015-228588

(51) Int. Cl.
*H02J 7/00* (2006.01)
*H01R 33/94* (2006.01)
*G06F 1/16* (2006.01)
*H04M 1/04* (2006.01)
(Continued)

(52) U.S. Cl.
CPC .......... *H02J 7/0045* (2013.01); *G06F 1/1632* (2013.01); *H01R 13/6205* (2013.01);
(Continued)

(58) Field of Classification Search
CPC .......... H02J 7/0045; H02J 7/00; H02J 7/0021; H02J 7/0042; H02J 7/0044; G06F 1/1632;
(Continued)

(56) References Cited

U.S. PATENT DOCUMENTS

| 2012/0091958 A1 | 4/2012 | Ichikawa et al. |
| 2012/0106069 A1* | 5/2012 | Strauser ................ G06F 1/1632 |
| | | 361/679.41 |

(Continued)

FOREIGN PATENT DOCUMENTS

| JP | 52-103332 U | 8/1977 |
| JP | 2-39467 U | 3/1990 |

(Continued)

OTHER PUBLICATIONS

Decision of Refusal for corresponding JP 2015-228588, dated Apr. 26, 2017.

(Continued)

*Primary Examiner* — Zixuan Zhou
(74) *Attorney, Agent, or Firm* — Sughrue Mion, PLLC

(57) ABSTRACT

A charging system for a portable terminal device of this invention includes: a charging stand, on which a portable terminal device is to be removably mounted; and a charging cable, which is to be removably mounted to the portable terminal device. The charging stand includes: a terminal mounting section on which the portable terminal device is to be mounted; and a stand charging terminal, which is configured to come into abutment with a charged terminal of the portable terminal device mounted on the terminal mounting section, to thereby charge the portable terminal device. The charging cable includes a cable charging terminal, which is configured to come into abutment with the charged terminal of the portable terminal device to which the charging cable is mounted, to thereby charge the portable terminal device.

4 Claims, 21 Drawing Sheets

(51) Int. Cl.
*H01R 13/62* (2006.01)
*H01R 33/88* (2006.01)
*H01R 33/90* (2006.01)
*H01R 24/28* (2011.01)
*H01R 105/00* (2006.01)

(52) U.S. Cl.
CPC ............ *H01R 33/88* (2013.01); *H01R 33/90* (2013.01); *H01R 33/94* (2013.01); *H02J 7/00* (2013.01); *H02J 7/0021* (2013.01); *H02J 7/0042* (2013.01); *H02J 7/0044* (2013.01); *H04M 1/04* (2013.01); *H01R 24/28* (2013.01); *H01R 2105/00* (2013.01)

(58) Field of Classification Search
CPC .... H01R 13/6205; H01R 33/88; H01R 33/90; H01R 33/94; H04M 1/04
USPC .................................................. 320/113–115
See application file for complete search history.

(56) References Cited

U.S. PATENT DOCUMENTS

| | | | |
|---|---|---|---|
| 2013/0076136 A1 | 3/2013 | Manor et al. | |
| 2014/0113461 A1* | 4/2014 | Kim | H01R 13/6205 439/39 |
| 2014/0232341 A1 | 8/2014 | Ikegami | |

FOREIGN PATENT DOCUMENTS

| | | |
|---|---|---|
| JP | 04-188600 A | 7/1992 |
| JP | 05-167498 A | 7/1993 |
| JP | 05-91153 U | 12/1993 |
| JP | 07-194016 A | 7/1995 |
| JP | 08-33214 A | 2/1996 |
| JP | 11-178229 A | 7/1999 |
| JP | 2000-324220 A | 11/2000 |
| JP | 2002-354094 A | 12/2002 |
| JP | 2006-246217 A | 9/2006 |
| JP | 2010-063117 A | 3/2010 |
| JP | 2010-158126 A | 7/2010 |
| JP | 2013-094036 A | 5/2013 |
| JP | 2013-110915 A | 6/2013 |
| WO | 2010/122647 A1 | 7/1918 |

OTHER PUBLICATIONS

Decision to Grant a patent for corresponding JP 2017-133400, dated Oct. 4, 2017.
Written Opinion for PCT/JP2016/003891, dated Nov. 8, 2016.
International Search Report for PCT/JP2016/003891, dated Nov. 8, 2016.
Decision to Grant a patent dated Jul. 4, 2018 issued by the Japanese Patent Office in counterpart Application No. JP 2017-205919.

* cited by examiner

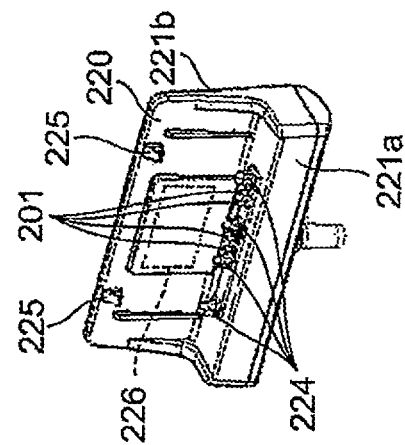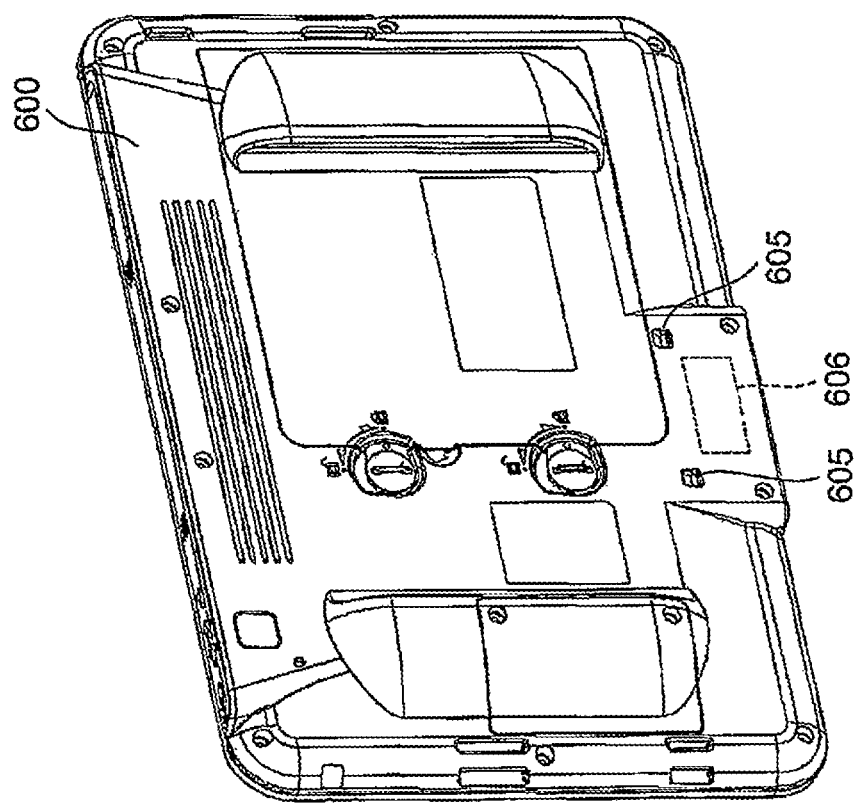
FIG. 4

CHARGING SYSTEM AND CHARGING CABLE FOR PORTABLE TERMINAL DEVICE

This application is a National Stage of International Application No. PCT/JP2016/003891 filed Aug. 26, 2016, claiming priority based on Japanese Patent Application No. 2015-228588 filed Nov. 24, 2015, the entire disclosure of which is incorporated herein by reference.

TECHNICAL FIELD

This invention relates to a charging system and a charging cable for a portable terminal device.

BACKGROUND ART

In a portable terminal device, a built-in battery (secondary battery) is required to be charged. The battery of the portable terminal device is charged by placing the portable terminal device on a charging stand (cradle) including one or more terminal mounting sections for one or more portable terminal devices.

A charging stand of this type is disclosed in, for example, Patent Document 1. The charging stand disclosed in Patent Document 1 includes a terminal mounting section on which the portable terminal device is to be removably mounted.

PRIOR ART DOCUMENT(S)

Patent Document(s)

Patent Document 1: JP 2013-094036 A

SUMMARY OF THE INVENTION

Problem to be Solved by the Invention

The portable terminal device being a type of information processing device is usually used for performing an input operation and visually recognizing a result of processing while the portable terminal device is held by a hand and display on a display is visually recognized. During a period in which such a portable terminal device is being charged with use of, for example, the charging stand disclosed in Patent Document 1, it is difficult to visually recognize the display on the display, and it is more difficult to perform an input operation. That is, it is difficult to perform some work with use of the portable terminal device during a period in which the portable terminal device is being charged on the charging stand.

For that reason, in a case of the portable terminal device that is placed on the charging stand to be charged, when the battery is about to run out during work with use of the portable terminal device, it is required to interrupt the work and place the portable terminal device on the charging stand to start the charging of the battery.

It is an object of this invention to provide a technology for solving the above-mentioned problem, and provide a charging system for a portable terminal device that enables the portable terminal device to be used while the portable terminal device is being charged.

Means to Solve the Problem

According to one aspect of this invention, there is provided a charging system for a portable terminal device, comprising a charging stand, on which a portable terminal device is to be removably mounted; and a charging cable, which is to be removably mounted to the portable terminal device, the charging stand including a terminal mounting section, on which the portable terminal device is to be mounted; and a stand charging terminal, which is configured to come into abutment with a charged terminal of the portable terminal device mounted on the terminal mounting section, to thereby charge the portable terminal device, the charging cable including a cable charging terminal, which is configured to come into abutment with the charged terminal of the portable terminal device to which the charging cable is mounted, to thereby charge the portable terminal device.

According to another aspect of this invention, there is provided a charging cable for a portable terminal device, which is to be removably mounted to a portable terminal device, the charging cable comprising a cable charging terminal, which is configured to come into abutment with a charged terminal of the portable terminal device to which the charging cable is mounted, to thereby charge the portable terminal device; and a terminal housing, which includes the cable charging terminal, and is to be removably mounted to the portable terminal device, the terminal housing including an attracting portion, which is configured to attract an attracted portion provided in the portable terminal device so that the terminal housing is maintained in a mounted state when the terminal housing is mounted to the portable terminal device, the attracting portion including a magnet when the attracted portion in the portable terminal device includes a metal plate, or including a metal plate or a magnet when the attracted portion in the portable terminal device includes a magnet.

Effect of the Invention

According to this invention, the charging system for a portable terminal device that enables the portable terminal device to be used while the portable terminal device is being charged can be obtained.

BRIEF DESCRIPTION OF THE DRAWING

FIG. 4 is a perspective view for illustrating the charging cable for a portable terminal device according to the first embodiment of this invention at a time before the charging cable is mounted to the portable terminal device.

MODES FOR EMBODYING THE INVENTION

The charging system for a portable terminal device according to this invention comprises a charging stand, on which a portable terminal device is to be removably mounted and a charging cable, which is to be removably mounted to the portable terminal device. The charging stand includes a terminal mounting section, on which the portable terminal device is to be mounted and a stand charging terminal, which is configured to come into abutment with a charged terminal of the portable terminal device mounted on the terminal mounting section, to thereby charge the portable terminal device. The charging cable includes a cable charging terminal, which is configured to come into abutment with the charged terminal of the portable terminal device to which the charging cable is mounted, to thereby charge the portable terminal device.

Further, the charging cable according to one embodiment of this invention includes a terminal housing having cable charging terminals. The terminal housing having the cable charging terminals is removably mounted to the portable terminal device. The cable charging terminals come into abutment with charged terminals of the portable terminal device to which the terminal housing is mounted, to thereby charge the portable terminal device. Further, the terminal housing includes an attracting portion. The attracting portion attracts an attracted portion provided in the portable terminal device so that the terminal housing is maintained in a mounted state when the terminal housing is mounted to the portable terminal device. Further, the attracting portion includes a magnet when the attracted portion in the portable terminal device includes a metal plate, or includes a metal plate or a magnet when the attracted portion in the portable terminal device includes a magnet.

According to this invention, with the above-mentioned configurations, even when the portable terminal device is a portable terminal device that is placed on the charging stand to be charged, the portable terminal device can be used while being charged.

Now, the charging system and the charging cable for a portable terminal device according to embodiments of this invention are more specifically described with reference to the drawings.

First Embodiment

Referring to FIG. 1 to FIG. 17, a charging system for a portable terminal device according to a first embodiment of this invention is used for charging portable terminal devices of a tablet type that are used in a self-ordering system being a mode of the point of sales (POS) system.

Figure 1:
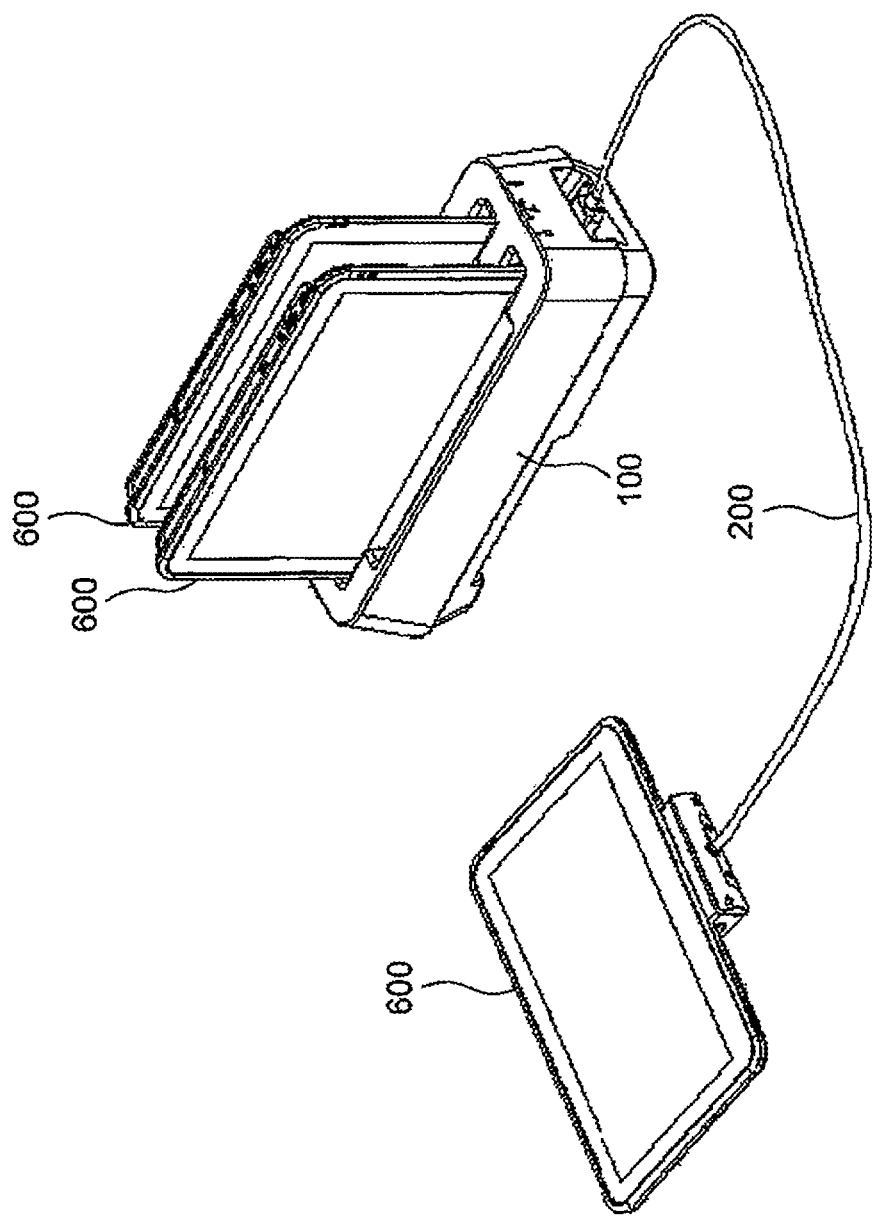
FIG. 1 is a perspective view for illustrating a charging system for a portable terminal device according to a first embodiment of this invention.
Figure 2:
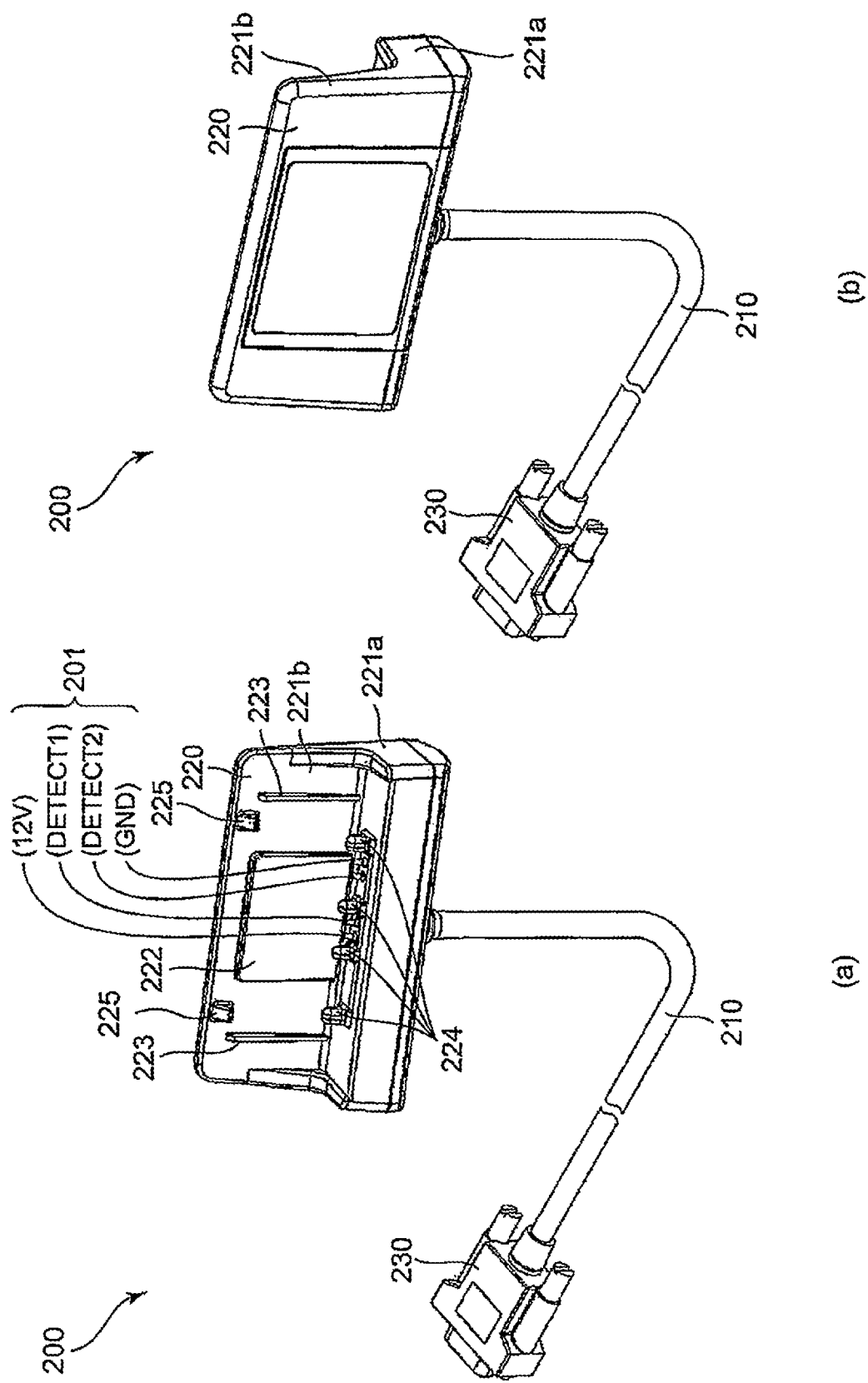
FIG. 2 includes (a) and (b) which are perspective views for illustrating a charging cable for a portable terminal device according to the first embodiment of this invention.

Referring to FIG. 1, this charging system includes a charging stand 100 and a charging cable 200.

On the charging stand 100, two portable terminal devices 600 are vertically placed. To a receptacle connector of the charging stand 100, which is to be described later, a plug connector of the charging cable 200, which is to be described later, is connected. The charging cable 200 is mounted to one portable terminal device 600, and the portable terminal device 600 is being charged.

The charging stand 100 has an alternating current (AC) adapter, which is to be described later, built therein, and is connected to a commercial power supply via an AC cable and an AC plug. However, in FIG. 1, illustrations of the AC cable and the AC plug are omitted. Further, as described later, one of the two portable terminal devices 600 mounted on the charging stand 100 is not supplied with a charging voltage, and thus is not being charged.

Referring to FIG. 2(a) and FIG. 2(b) further, the charging cable 200 includes a terminal housing 220, in which cable charging terminals are provided, a cable portion 210, and a plug connector 230.

The terminal housing 220 has an L-shaped cross section, and a base portion 221a thereof includes four contact pins 201 as the cable charging terminals. The four contact pins 201 are arranged in the base portion 221a in a line with predetermined intervals so as to correspond to the positions of charged terminals 601 (FIG. 8(c)) of the portable terminal device 600. Further, the four contact pins 201 have a sequence of 12V, DETECT1, DETECT2, and GND so as to match the charged terminals 601 (FIG. 8(c)) of the portable terminal device 600 having a sequence of 12V, DETECT1, DETECT2, and GND.

Two contact pins 201 (12V and GND) are used for supplying the charging voltage, and the other two contact pins 201 (DETECT1 and DETECT2) are used for detecting the portable terminal device 600 to which the terminal housing 220 (charging cable 200) is mounted. In the first embodiment, the contact pins 201 are pins of a so-called pogo-pin (trademark) type or a probe type. That is, each of the contact pins 201 includes an elastic portion (not shown), for example, a spring, through which an upper end of the contact pin 201 sinks from its original position when force is applied from above, and the upper end returns to its original position when the force is removed.

Further, the base portion 221a has guide projection portions 224, which correspond to terminal-adjacent recessed portions 604 (FIG. 8(c)) provided in a bottom surface of the portable terminal device 600. The guide projection portions 224 serve as guide portions at a time when the terminal housing 220 is set to the portable terminal device 600.

An upright portion 221b, which is provided upright from the base portion 221a of the terminal housing 220, has an abutment surface 222, which is configured to come into abutment with a rear surface of the portable terminal device 600. On each of both sides of the abutment surface 222, a rib 223, which is configured to come into abutment with the rear surface of the portable terminal device similarly to the abutment surface 222, is provided. On a rear side of the abutment surface 222 among portions inside the terminal housing 220, a magnet 226 (FIG. 3) is mounted as an attracting portion.

Further, the upright portion 221b has locking projection portions 225, which correspond to rear surface recessed portions 605 (FIG. 4) on the rear surface of the portable terminal device 600. The locking projection portions 225 are engaged with the rear surface recessed portions 605 on the rear surface of the portable terminal device 600 when the terminal housing 220 of the charging cable 200 is mounted to the portable terminal device 600. With this, the terminal housing 220 is prevented from shifting along the rear surface of the portable terminal device 600 to come off the portable terminal device 600.

Figure 3:
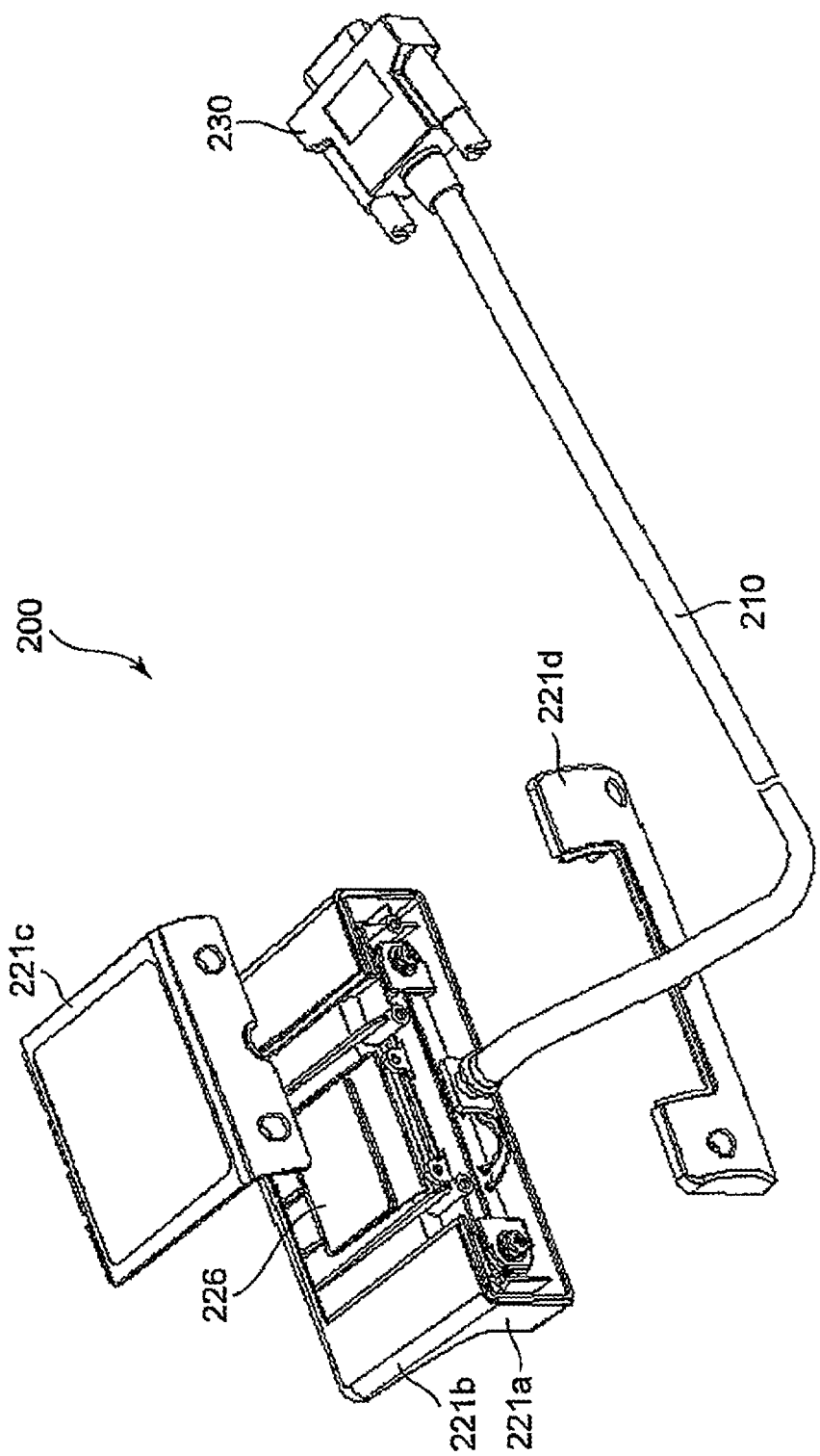
FIG. 3 is a perspective view for illustrating the charging cable for a portable terminal device according to the first embodiment of this invention, in which a part of a terminal housing is exploded.

FIG. 3 is a perspective view for illustrating the charging cable 200. In FIG. 3, the terminal housing 220 is in a state in which a bottom cover 221d and a rear cover 221c are removed.

Figure 5:
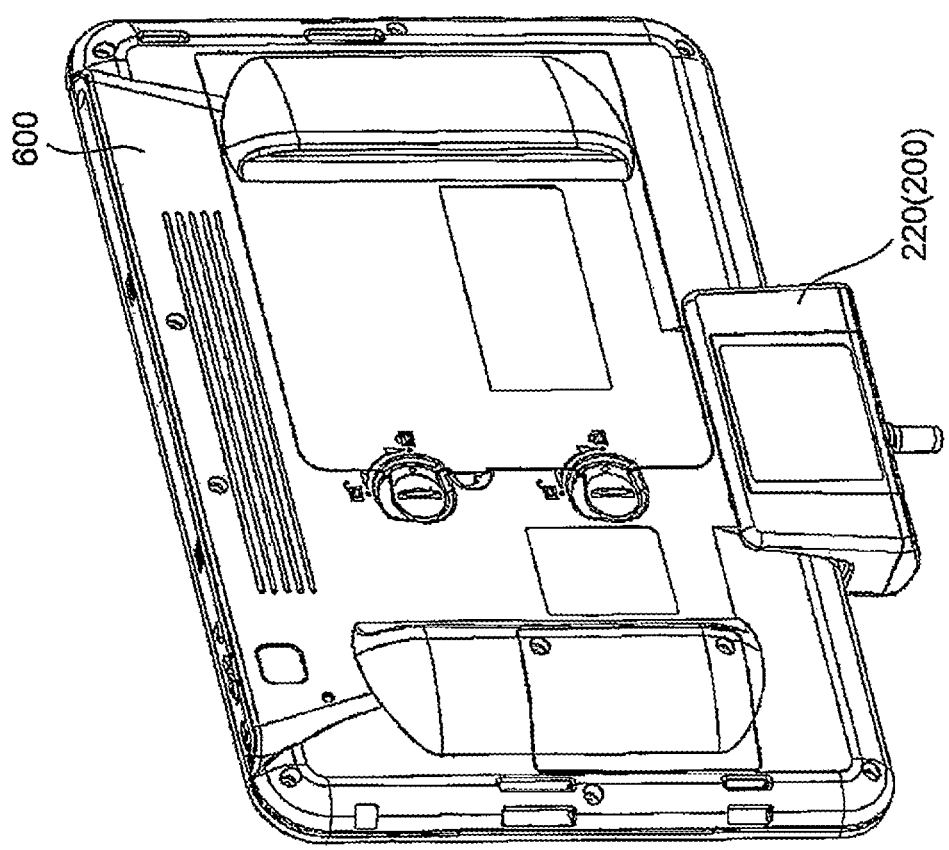
FIG. 5 is a perspective view for illustrating the charging cable for a portable terminal device according to the first embodiment of this invention at a time after the charging cable is mounted to the portable terminal device.

Referring to FIG. 3, FIG. 4, and FIG. 5 further, the magnet 226 is mounted inside the terminal housing 220. The magnet 226 maintains, by a magnetic force generated between the magnet 226 and a metal plate 606 provided in the housing of the portable terminal device 600, contact of the contact pins (cable charging terminals) 201 of the charging cable 200 with the charged terminals 601 (FIG. 8(c)) of the portable terminal device 600 when the terminal housing 220 of the charging cable 200 is mounted to the portable terminal device 600. In the first embodiment, the metal plate 606 provided in the portable terminal device 600 is made of a metal that is attracted by the magnet 226, for example, iron.

The terminal housing 220 of the charging cable 200 is mounted to the portable terminal device 600 in the following manner.

As illustrated in FIG. 5, the base portion 221a of the terminal housing 220 shown in FIG. 4 is brought into abutment with the bottom surface of the portable terminal device 600, on which the charged terminals 601 (FIG. 8(c)) are provided. At this time, the guide projection portions 224 of the base portion 221a are matched with the terminal-adjacent recessed portions 604 (FIG. 8(c)) on the bottom surface of the portable terminal device 600. Together with this, the upright portion 221b of the terminal housing 220 is brought into abutment with the rear surface of the portable terminal device 600 as illustrated in FIG. 5.

As described above, inside the upright portion 221b of the terminal housing 220, the magnet 226 is provided as indicated by the broken line in FIG. 4. Meanwhile, inside the housing of the portable terminal device 600, the metal plate 606 is provided as indicated by the broken line in FIG. 4. By a magnetic force generated between the magnet 226 and the metal plate 606, the charging terminals of the terminal housing 220 are kept abutting on the charged terminals of the portable terminal device. Further, on the upright portion 221b of the terminal housing 220, the locking projection portions 225 are provided. Meanwhile, on the rear surface of the portable terminal device 600, the rear surface recessed portions 605 are provided. The locking projection portions 225 are engaged with the rear surface recessed portions 605, and thus the terminal housing 220 is prevented from shifting along the rear surface of the portable terminal device 600 to come off the portable terminal device 600.

Figure 6:
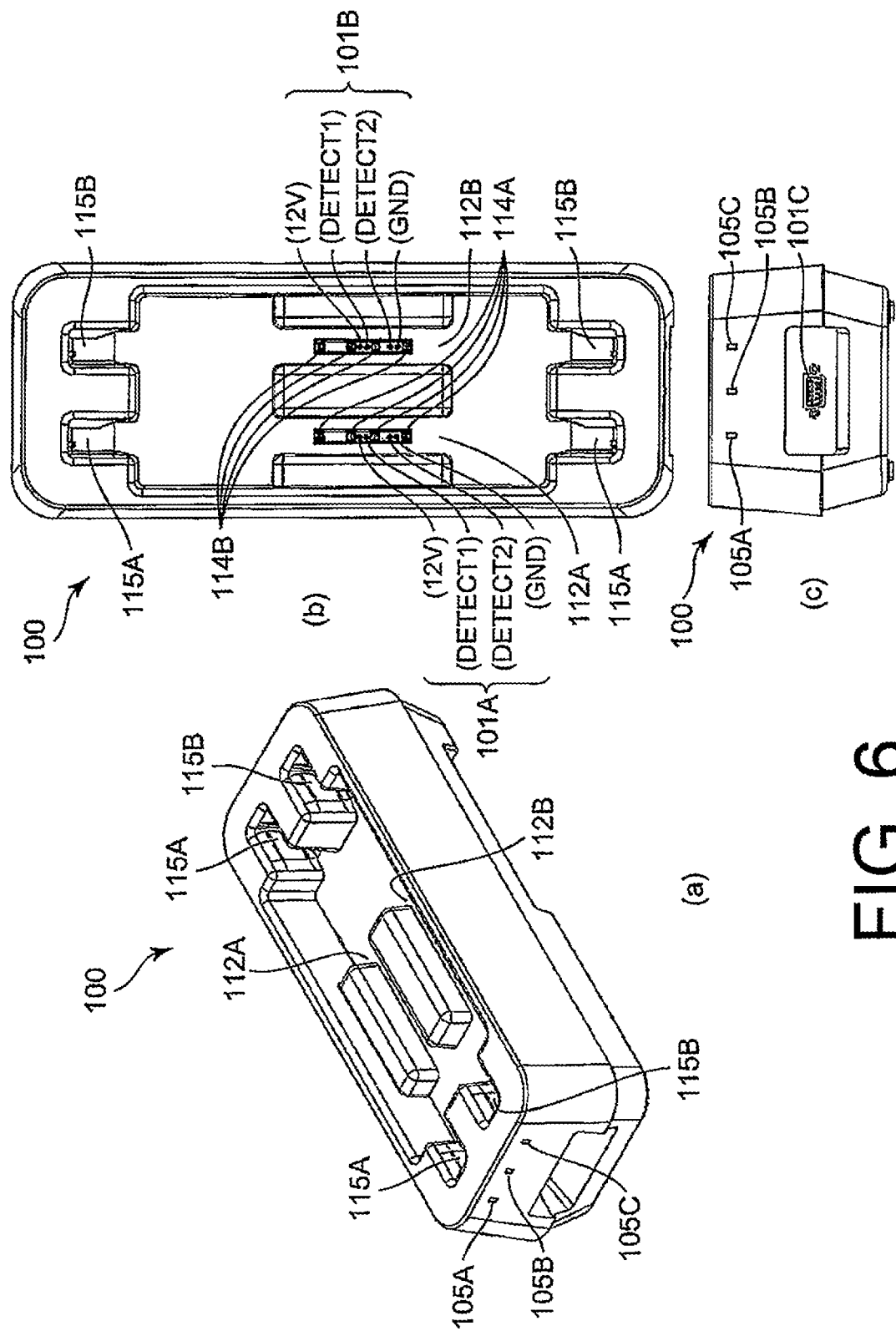
FIG. 6 includes (a), (b), and (c) which are a perspective view, a top view, and a front view for illustrating a charging stand in the charging system for a portable terminal device according to the first embodiment of this invention, respectively.

Referring to FIG. 6(a), FIG. 6(b), and FIG. 6(c) further, in the charging stand 100, two terminal mounting sections 112A and 112B, three display portions (light emitting diodes (LEDs)) 105A, 105B, and 105C, and one receptacle connector 101C are provided. The charging stand 100 has the AC adapter, which is to be described later, built therein, and is connected to a commercial power supply via the AC cable and the AC plug. However, in FIG. 6, illustrations of the AC cable and the AC plug are omitted.

In the terminal mounting sections 112A and 112B, four contact pins 101A and 101B are provided as stand charging terminals, respectively. Two (12V and GND) of the respective contact pins are used for supplying the charging voltage, and the other two (DETECT1 and DETECT2) of the respective contact pins are used for detecting the placed portable terminal device 600. The four contact pins 101A and 101B are arranged in the terminal mounting sections 112A and 112B in a line with predetermined intervals so as to correspond to the positions of the charged terminals 601 (FIG. 8(c)) of the portable terminal device 600, respectively. Further, the four contact pins 101A and 101B each have a sequence of 12V, DETECT1, DETECT2, and GND so as to match the charged terminals 601 (FIG. 8(c)) of the portable terminal device 600 having the sequence of 12V, DETECT1, DETECT2, and GND. The above-mentioned arrangement and sequence of the four contact pins 201 of the terminal housing 220 of the charging cable 200 and the arrangement and sequence of the four contact pins 101A and 101B of the two terminal mounting sections 112A and 112B of the charging stand 100 are the same.

Similarly to the contact pins (cable charging terminals) 201 of the charging cable 200, the contact pins 101A and 101B are pins of the so-called pogo-pin (trademark) type or the probe type. That is, each of the contact pins 101A and 101B includes an elastic portion (not shown), for example, a spring, through which an upper end of the contact pin sinks from its original position when force is applied from above, and the upper end returns to its original position when the force is removed. In particular, in the first embodiment, as each of the contact pins 101A and 101B, the same component as the contact pin (cable charging terminal) 201 is used.

Further, the terminal mounting sections 112A and 112B have guide end portions 115A and 115B, respectively, which are configured to guide the portable terminal device at a time when the portable terminal device 600 is placed. As understood from FIG. 6(b), the guide end portions 115A and 115B each have a shape conforming to the outer shape of each of both side portions of the portable terminal device 600, which is vertically placed. With use of the guide end portions 115A and 115B, the portable terminal device 600 is vertically placed so that the display surface thereof faces toward one direction as shown in FIG. 1. Through this placement of the portable terminal device 600, the assignment of 12V, DETECT1, DETECT2, and GND of the charged terminals 601 of the portable terminal device 600 is matched with the assignment of 12V, DETECT1, DETECT2, and GND of the contact pins 101A and 101B.

Further, near the contact pins 101A and 101B, similarly to the guide projection portions 224 of the charging cable 200, guide projection portions 114A and 114B, which correspond to the terminal-adjacent recessed portions 604 on the bottom surface of the portable terminal device 600, are provided.

The portable terminal device 600 is placed on the charging stand 100 and charged in the following manner. Specifically, the portable terminal device 600 is held above the terminal mounting section 112A or 112B so as to conform to the shape of the guide end portion 115A or 115B of the terminal mounting section 112A or 112B, and is then released. The released portable terminal device 600 sinks into the terminal mounting section 112A or 112B with its own weight. As a result, the charged terminals 601 of the portable terminal device 600 and the contact pins 101A or 101B provided in the terminal mounting section 112A or 112B come into contact. The portable terminal device 600 is thus charged.

The display portions (LEDs) 105A, 105B, and 105C correspond to charging ports 1, 2, and 3, respectively. The charging port 1 corresponds to the terminal mounting section 112A including the contact pins (stand charging terminals) 101A. The charging port 2 corresponds to the terminal mounting section 112B including the contact pins (stand charging terminals) 101B. The charging port 3 corresponds to the charging cable 200, which is connected to the charging stand 100 via the receptacle connector 101C, more specifically, to the terminal housing 220 including the contact pins (cable charging terminals) 201. The display portions 105A, 105B, and 105C represent a state of the supply of the charging voltage to the charging ports 1, 2, and 3, respectively. Specifically, the display portions that are emitting light represent that the charging voltage is being supplied, and the display portions that are not emitting light represent that the charging voltage is shut off.

Figure 7:
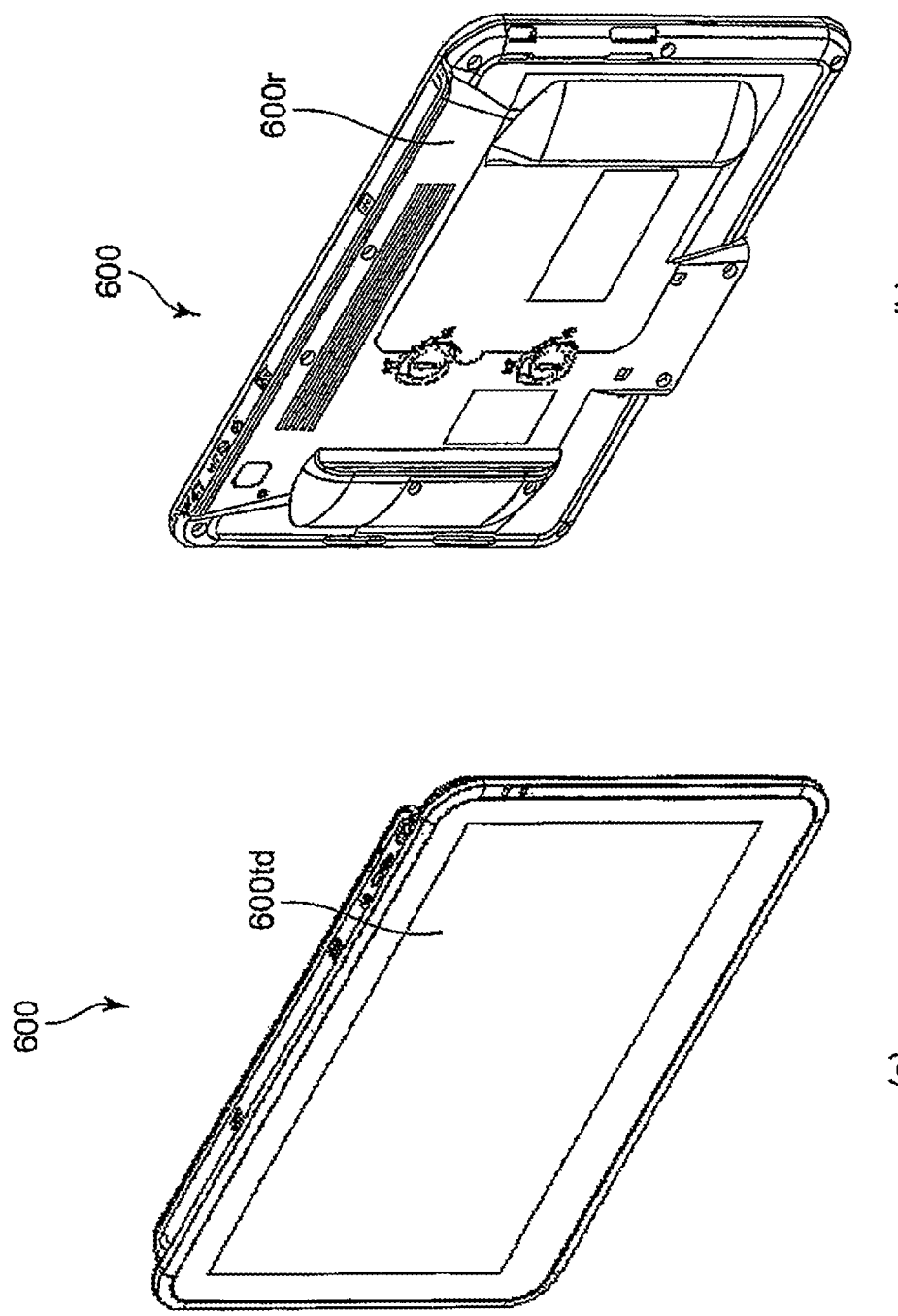
FIG. 7 includes (a) and (b) which are perspective views for illustrating the portable terminal device.
Figure 8:
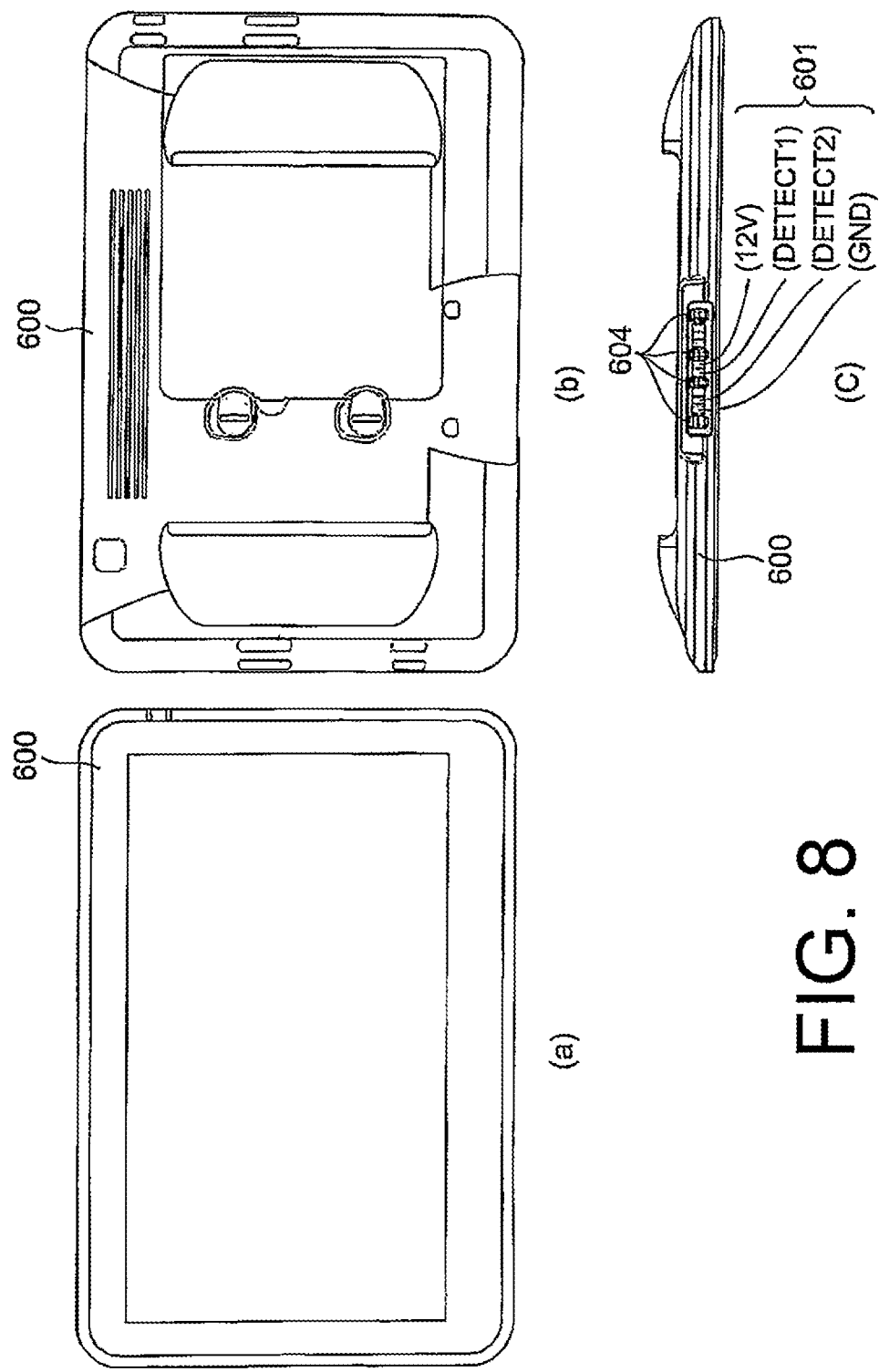
FIG. 8 includes (a), (b), and (c) which are a front view, a rear view, and a bottom view for illustrating the portable terminal device, respectively.

Referring to FIG. 7(a), FIG. 7(b), and FIG. 8 further, the portable terminal device 600, which is the target device of the charging system and the charging cable of the first embodiment, includes a display 600td including a touch panel on the front surface. Further, the portable terminal device 600 includes a resin rear panel 600r on the rear surface, and the charged terminals 601 and the terminal-adjacent recessed portions 604 on the bottom surface.

The charged terminals 601 include the terminals (12V and GND) for charging and the terminals (DETECT1 and DETECT2) for detecting the portable terminal device.

Figure 9:
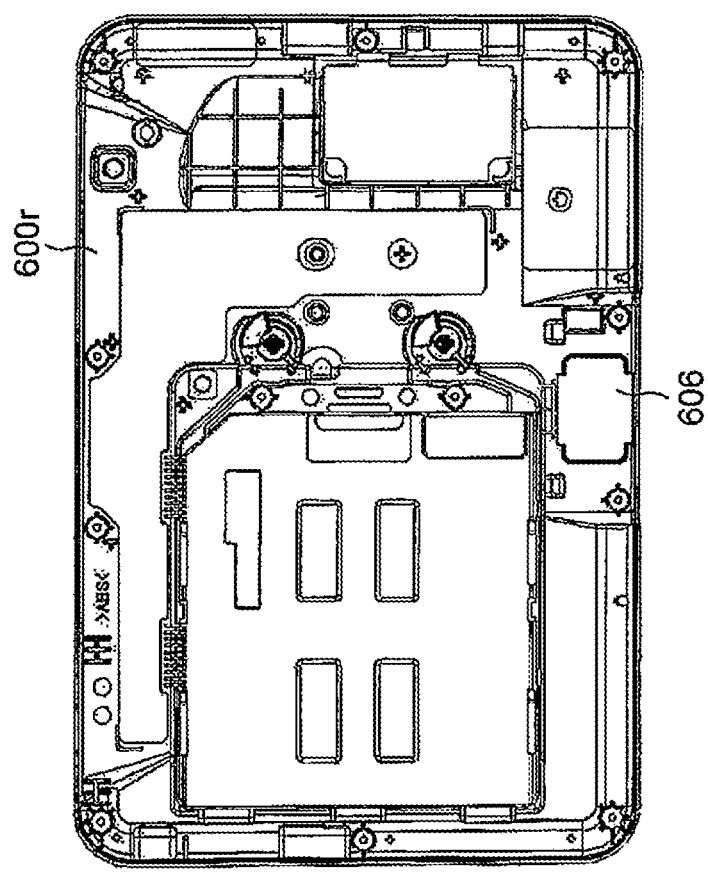
FIG. 9 is a rear view for illustrating the portable terminal device, in which a rear cover thereof is removed.

As illustrated in FIG. 9, on an inner side surface of the rear panel 600r, the metal plate 606, which is attracted to the magnet 226 built in the terminal housing 220 of the charging cable 200, is attached. In FIG. 9, some illustrations of the mounted components other than the metal plate 606 are omitted.

Figure 10:
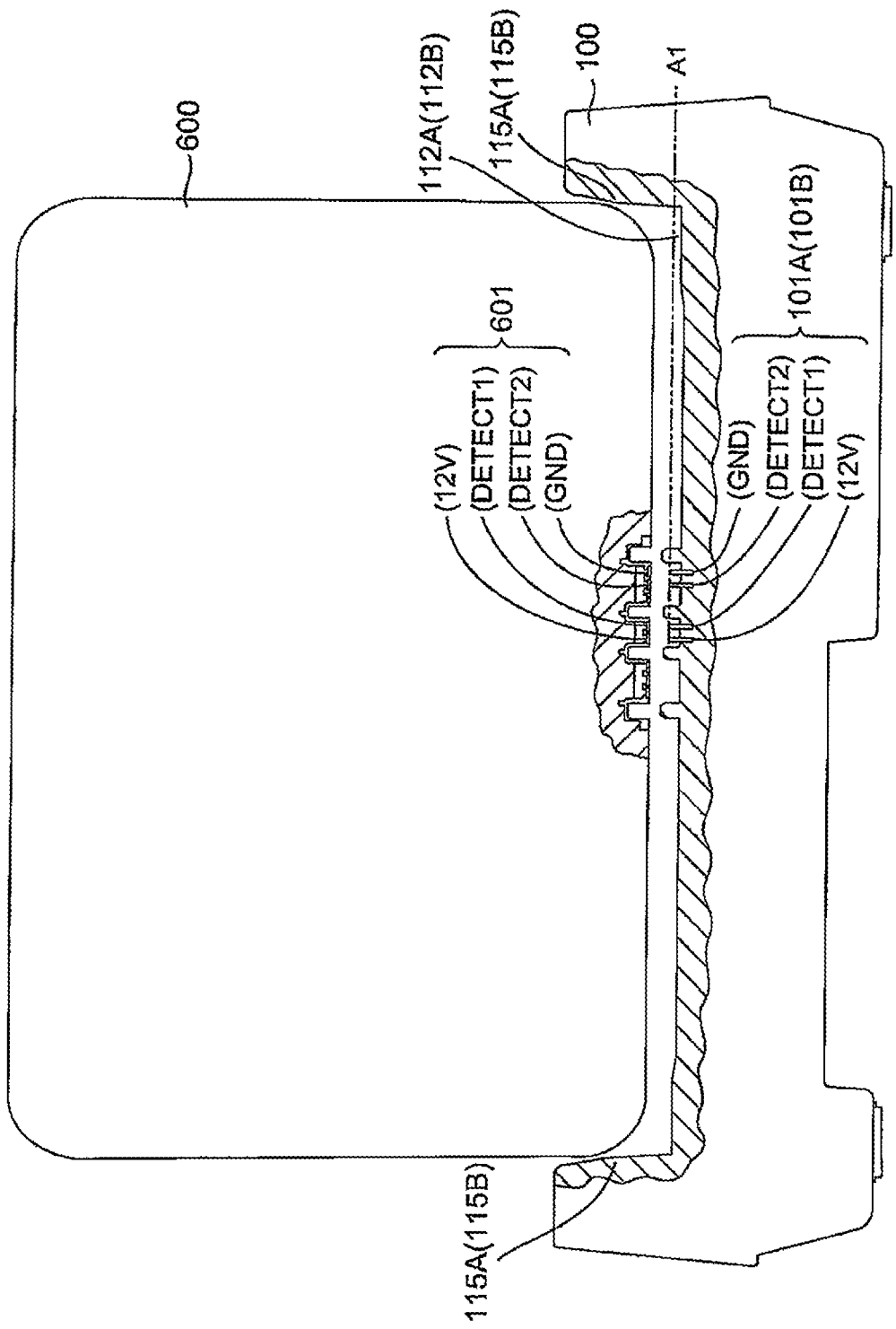
FIG. 10 is a front view for illustrating the charging stand in the charging system for a portable terminal device according to the first embodiment of this invention at a time before the portable terminal device is mounted on the charging stand, in which the charging stand is partially broken.
Figure 11:
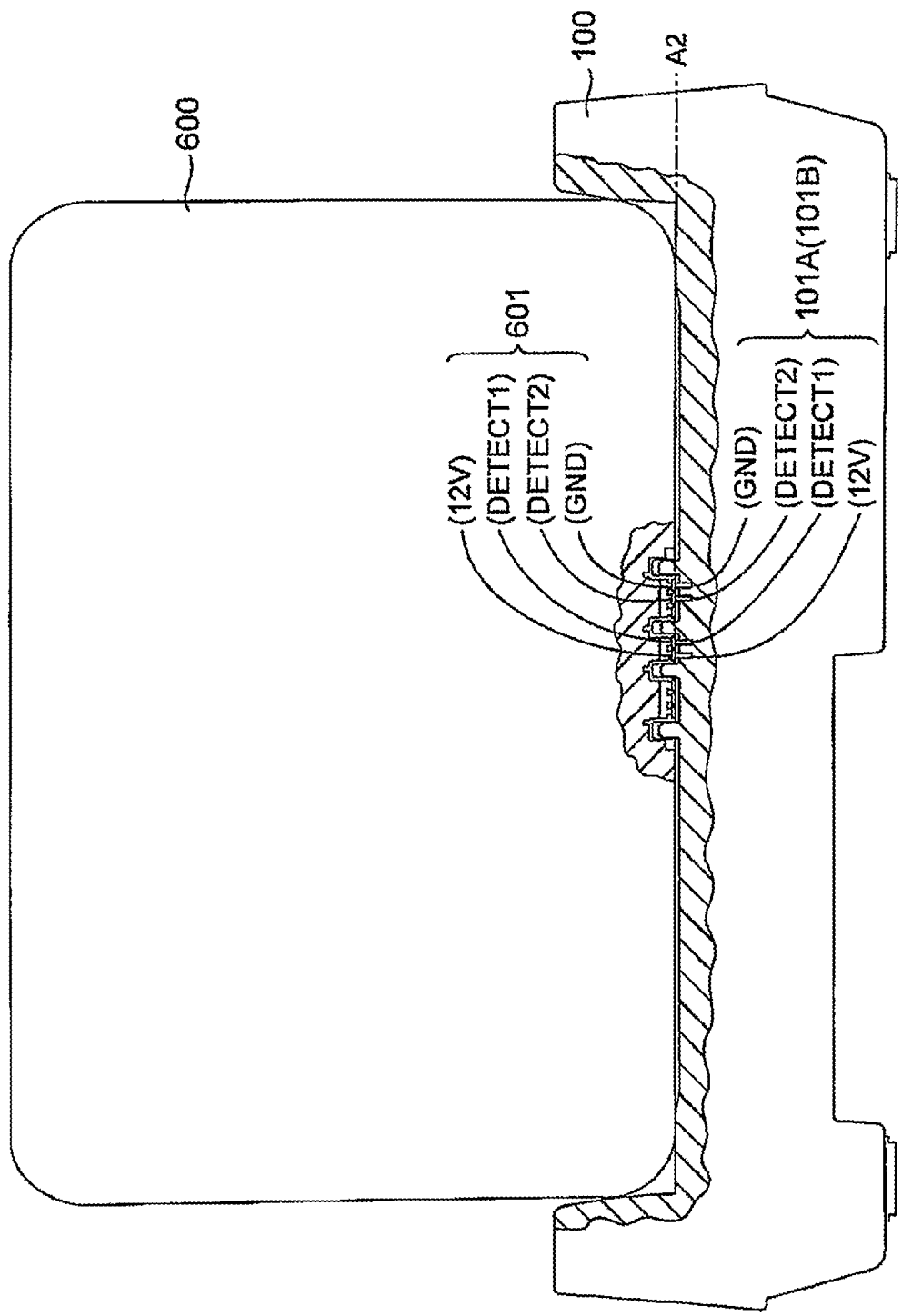
FIG. 11 is a front view for illustrating the charging stand in the charging system for a portable terminal device according to the first embodiment of this invention at a time after the portable terminal device is mounted on the charging stand, in which the charging stand is partially broken.

FIG. 10 and FIG. 11 are views for illustrating a state in which the charged terminals 601 of the portable terminal device 600 and the contact pins 101A or 101B of the charging stand 100 come into abutment or contact with each other. FIG. 10 is a view obtained before the abutment, and FIG. 11 is a view obtained after the abutment. When the bottom surface of the portable terminal device 600 comes into abutment with a mounting surface of the terminal mounting section 112A or 112B of the charging stand 100, the upper ends of the contact pins 101A or 101B are pushed down by the charged terminals 601 of the portable terminal device 600, and sink from a position A1 to a position A2.

Figure 12:
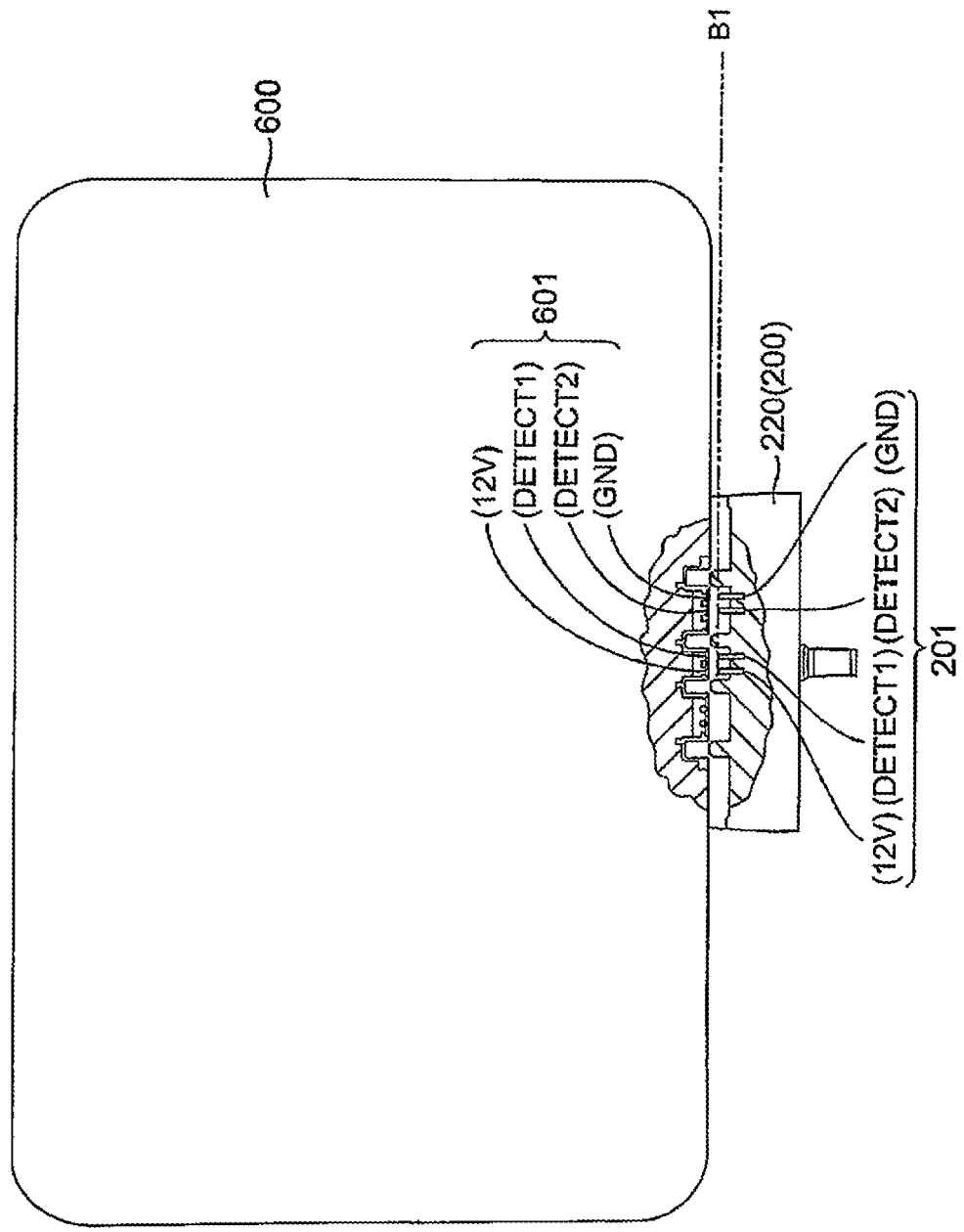
FIG. 12 is a front view for illustrating the charging cable for a portable terminal device according to the first embodiment of this invention at a time before the charging cable is mounted to the portable terminal device, in which the charging cable is partially broken.
Figure 13:
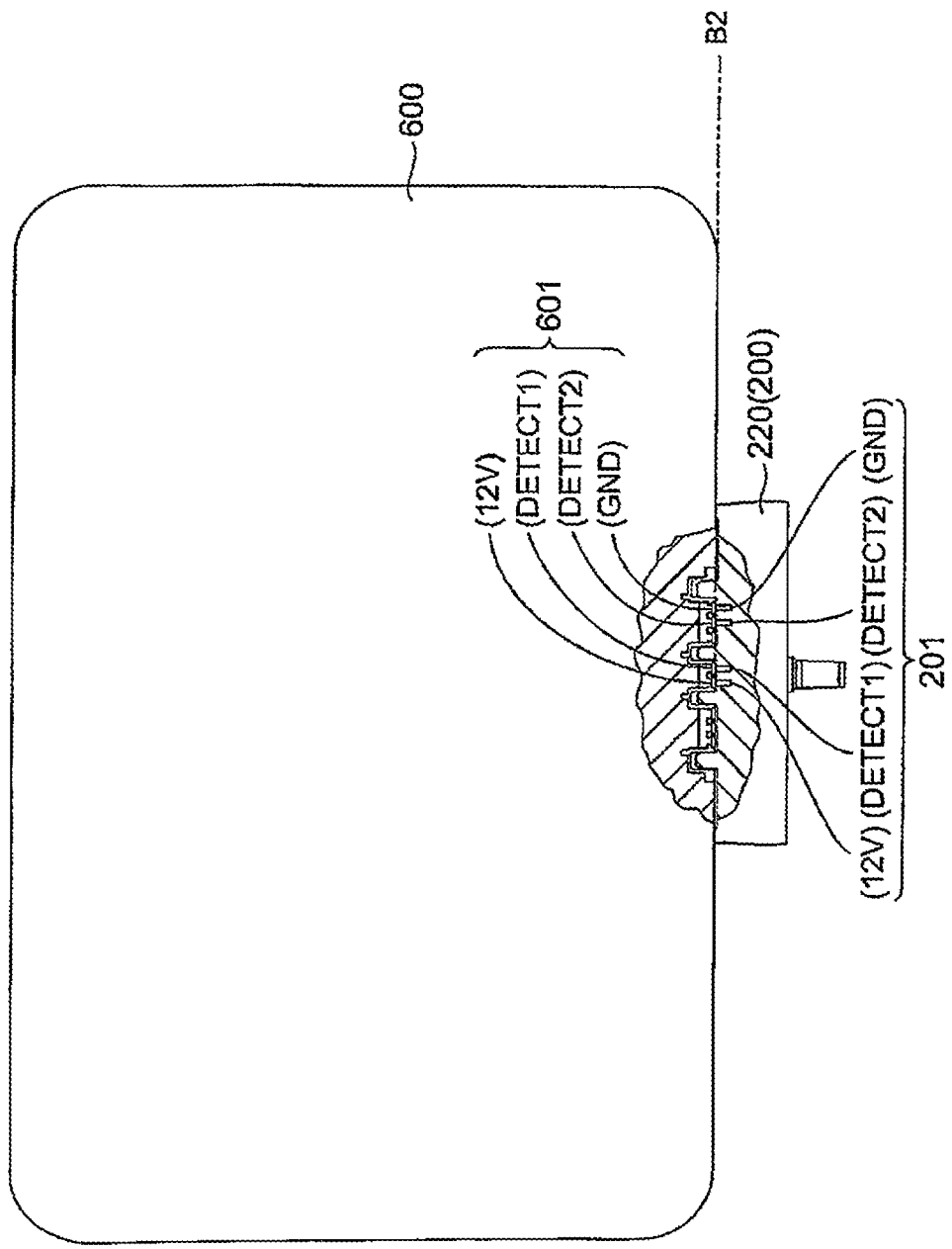
FIG. 13 is a front view for illustrating the charging cable for a portable terminal device according to the first embodiment of this invention at a time after the charging cable is mounted to the portable terminal device, in which the charging cable is partially broken.
Figure 14:
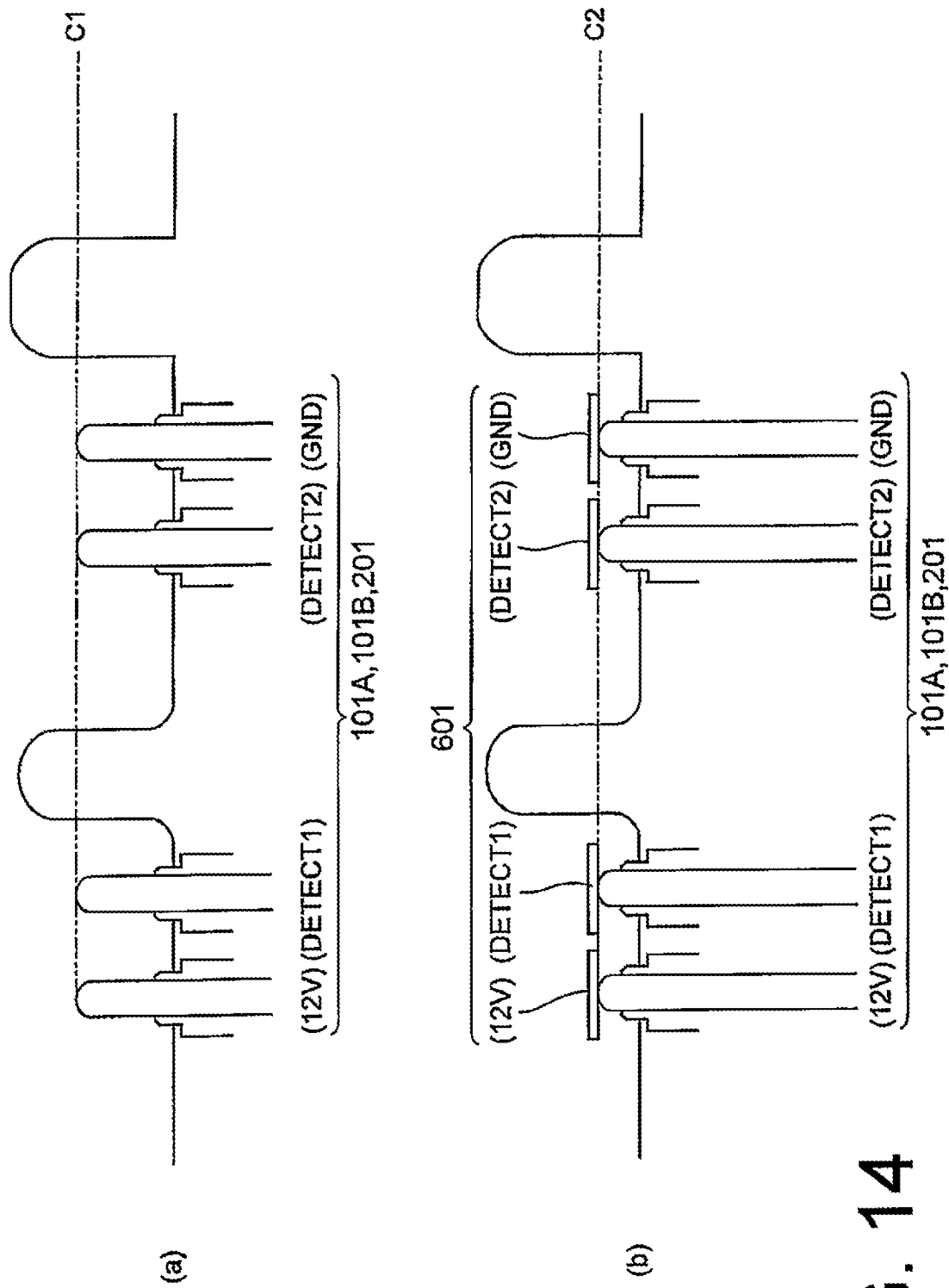
FIG. 14 includes (a) which is a view for partially illustrating the charging stand in the charging system for a portable terminal device according to the first embodiment of this invention at a time before the portable terminal device is mounted on the charging stand, and the charging cable for a portable terminal device according to the first embodiment of this invention at a time before the charging cable is mounted to the portable terminal device, and (b) which is a view for partially illustrating the charging stand in the charging system for a portable terminal device according to the first embodiment of this invention at a time after the portable terminal device is mounted on the charging stand, and the charging cable for a portable terminal device according to the first embodiment of this invention at a time after the charging cable is mounted to the portable terminal device.

FIG. 12 and FIG. 13 are views for illustrating a state in which the charged terminals 601 of the portable terminal device 600 and the contact pins 201 of the charging cable 200 come into abutment or contact with each other. FIG. 12 is a view obtained before the abutment, and FIG. 13 is a view obtained after the abutment. When the bottom surface of the portable terminal device 600 comes into abutment with the base portion of the terminal housing 220 of the charging cable 200, the upper ends of the contact pins 201 are pushed down by the charged terminals 601 of the portable terminal device 600, and sink from a position B1 to a position B2.

FIG. 14(a) and FIG. 14(b) are views for illustrating, in an enlarged manner, a state in which the charged terminals 601 of the portable terminal device 600 and the contact pins of the charging stand 100 or the charging cable 200 come into abutment with each other. FIG. 14(a) is a view obtained before the abutment, and FIG. 14(b) is a view obtained after the abutment. When the bottom surface of the portable terminal device 600 comes into abutment with the mounting surface of the terminal mounting section 112A or 112B of the charging stand 100 (or with the base portion of the terminal housing 220 of the charging cable 200), the upper ends of the contact pins 101A or 101B (or of the contact pins 201) are pushed down by the charged terminals 601 of the portable terminal device 600. With this, the contact pins 101A or 101B (or the contact pins 201) sink from a position C1 to a position C2. The contact pins 101A and 101B and the contact pins 201 have the same stroke amounts from their original position to the position to which the contact pins sink by being pushed down by the charged terminals 601 of the portable terminal device 600.

As seen from FIG. 7 to FIG. 14, the portions of the charged terminals 601 of the portable terminal device 600 that come into abutment with the contact pins 101A or 101B of the charging stand 100 and the portions of the charged terminals 601 of the portable terminal device 600 that come into abutment with the contact pins 201 of the charging cable 200 are the same. Accordingly, the charged terminals 601 of the portable terminal device 600 come into abutment with the contact pins 101A or 101B of the charging stand 100 and with the contact pins 201 of the charging cable 200 in the same manner.

Figure 15:
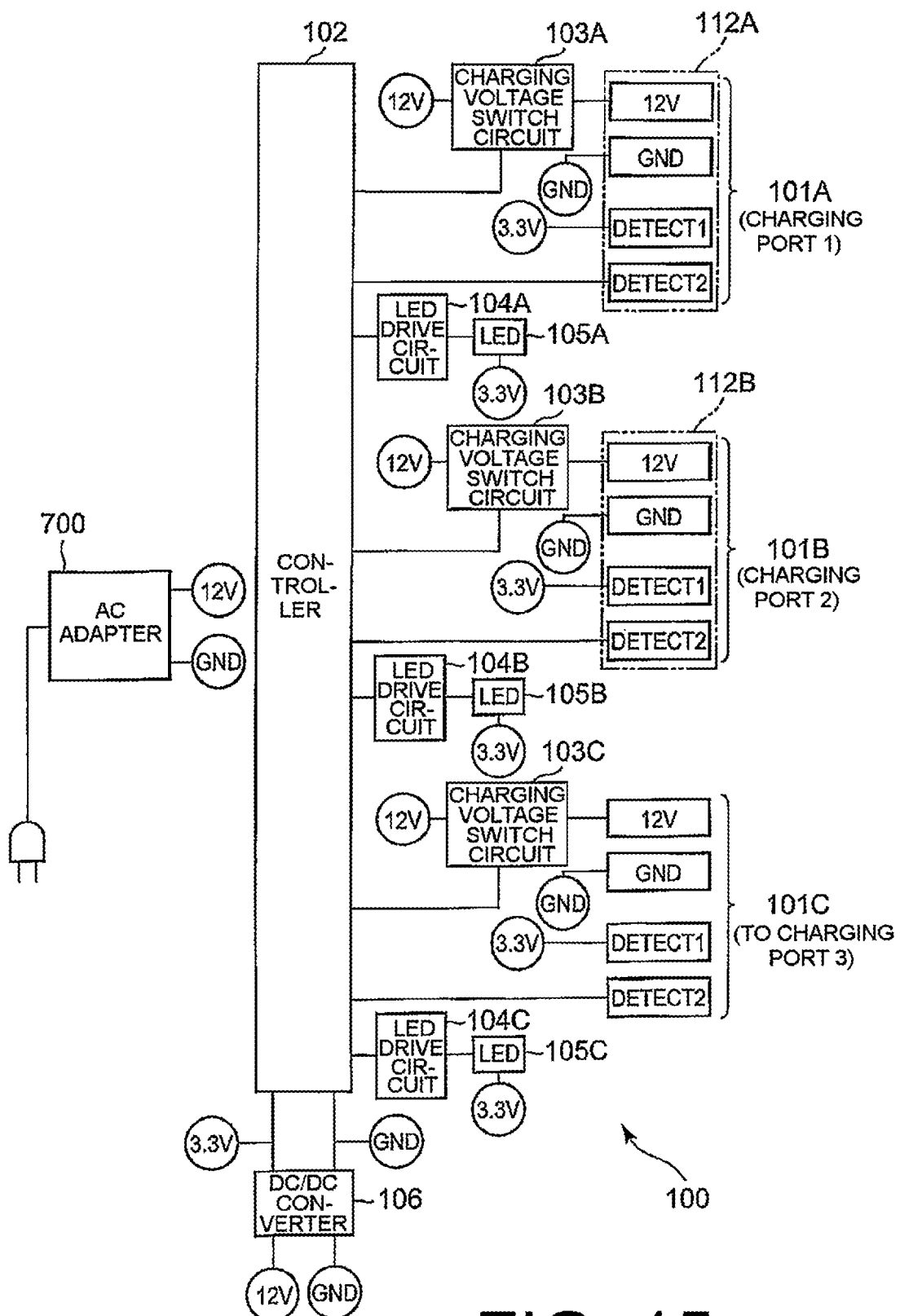
FIG. 15 is an electric circuit diagram of the charging stand in the charging system for a portable terminal device according to the first embodiment of this invention.

Referring to FIG. 15 for illustrating a circuit configuration of the charging stand 100 further, an AC adapter 700, which is connected to a commercial power supply (not shown), converts AC 100 V into DC 12 V. In the first embodiment, the AC adapter 700 is built in the charging stand 100. However, the AC adapter 700 may be provided outside the charging stand 100.

In the charging stand 100, a DC/DC converter 106 converts DC 12 V into DC 3.3 V.

The charging stand 100 includes the charging ports 1 and 2, and the receptacle connector corresponding to the charging port 3. The charging port 1 corresponds to the terminal mounting section 112A including the contact pins (stand charging terminals) 101A. The charging port 2 corresponds to the terminal mounting section 112B including the contact pins (stand charging terminals) 101B. The charging port 3 corresponds to the charging cable 200, which is connected to the charging stand 100 via the receptacle connector 101C, more specifically, to the terminal housing 220 including the contact pins (cable charging terminals) 201.

The contact pins 101A and 101B of the charging ports 1 and 2 each include the terminals of "12V", "GND", "DETECT1", and "DETECT2". Further, the receptacle connector 101C corresponding to the charging port 3 also includes the terminals of "12V", "GND", "DETECT1", and "DETECT2".

The terminal "12V" and the terminal "GND" in each of the contact pins 101A and 101B and the receptacle connector 101C are supplied with the charging voltage. A controller 102 of the charging stand 100 controls charging voltage switch circuits 103A, 103B, and 103C to turn on and off the charging voltage of 12 V.

The terminal "DETECT1" and the terminal "DETECT2" in each of the contact pins 101A and 101B and the receptacle connector 101C are used for detecting the portable terminal device 600. The terminal "DETECT1" is supplied with a voltage of 3.3 V. Meanwhile, the terminal "DETECT1" and the terminal "DETECT2" of the charged terminals 601 (FIG. 8(c)) of the portable terminal device 600 are electrically conducted inside the portable terminal device 600. Thus, when the portable terminal device 600 is placed onto the terminal mounting section 112A or 112B of the charging stand 100, or the terminal housing 220 of the charging cable 200 is mounted to the portable terminal device 600, a voltage of 3.3 V at the terminal "DETECT1" is output to the terminal "DETECT2" in the contact pins 101A or 101B or the receptacle connector 101C.

Further, when a voltage of a High level (3.3 V) is detected at the terminal "DETECT2", at which the voltage is normally at a Low level, the controller 102 of the charging stand 100 determines that the portable terminal device 600 is detected, and turns on the charging voltage switch circuit 103A, 103B, or 103C to supply the charging voltage. Together with this, the controller 102 controls an LED drive circuit 104A, 104B, or 104C to cause the LED 105A, 105B, or 105C to emit light.

When the voltage of the High level (3.3 V) is not detected anymore at the terminal "DETECT2", the controller 102 determines that the portable terminal device 600 is not detected anymore, and turns off the charging voltage switch circuit 103A, 103B, or 103C to shut off the charging voltage. Together with this, the controller 102 controls the LED drive circuit 104A, 104B, or 104C to cause the LED 105A, 105B, or 105C to stop emitting light.

Figure 16:
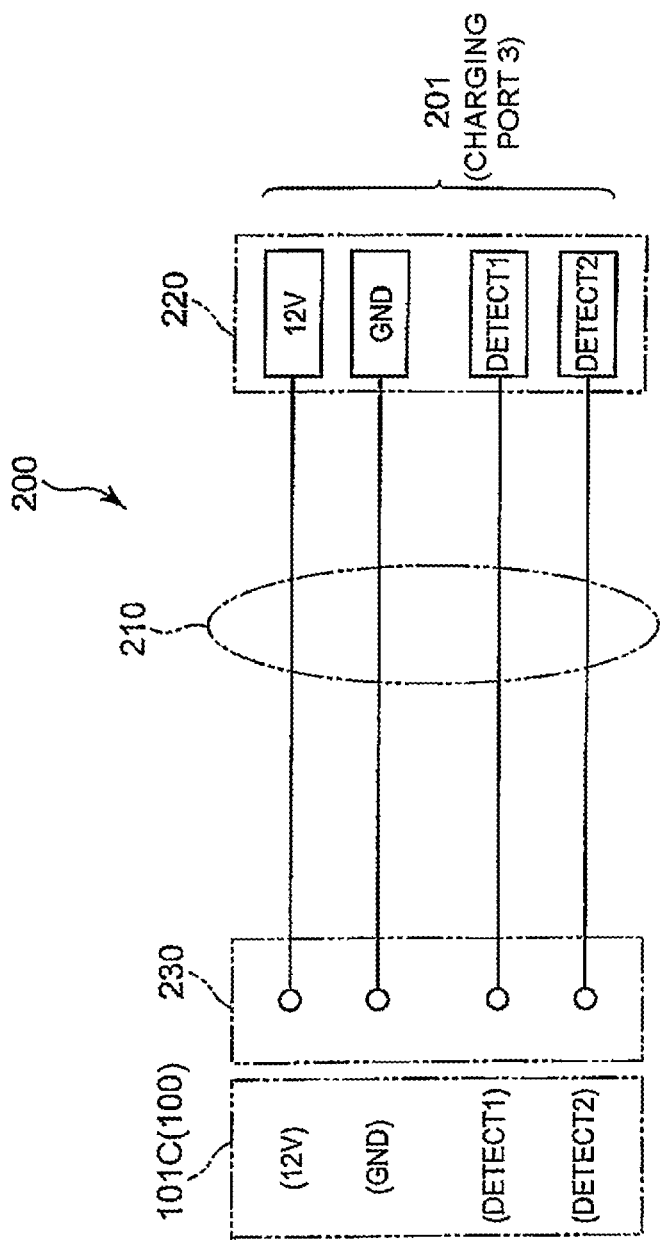
FIG. 16 is an electric circuit diagram of the charging cable for a portable terminal device according to the first embodiment of this invention.

Referring to FIG. 16 being a circuit diagram of the charging cable 200 further, the charging cable 200 has the plug connector 230 connected to the receptacle connector 101C (FIG. 15) of the charging stand 100. To the plug connector 230, the contact pins (cable charging terminals) 201 are connected via the cable portion 210. The terminal housing 220 including the contact pins 201 forms the charging port 3. The contact pins 201 of the charging port 3 include the terminals of "12V", "GND", "DETECT1", and "DETECT2".

Figure 17:
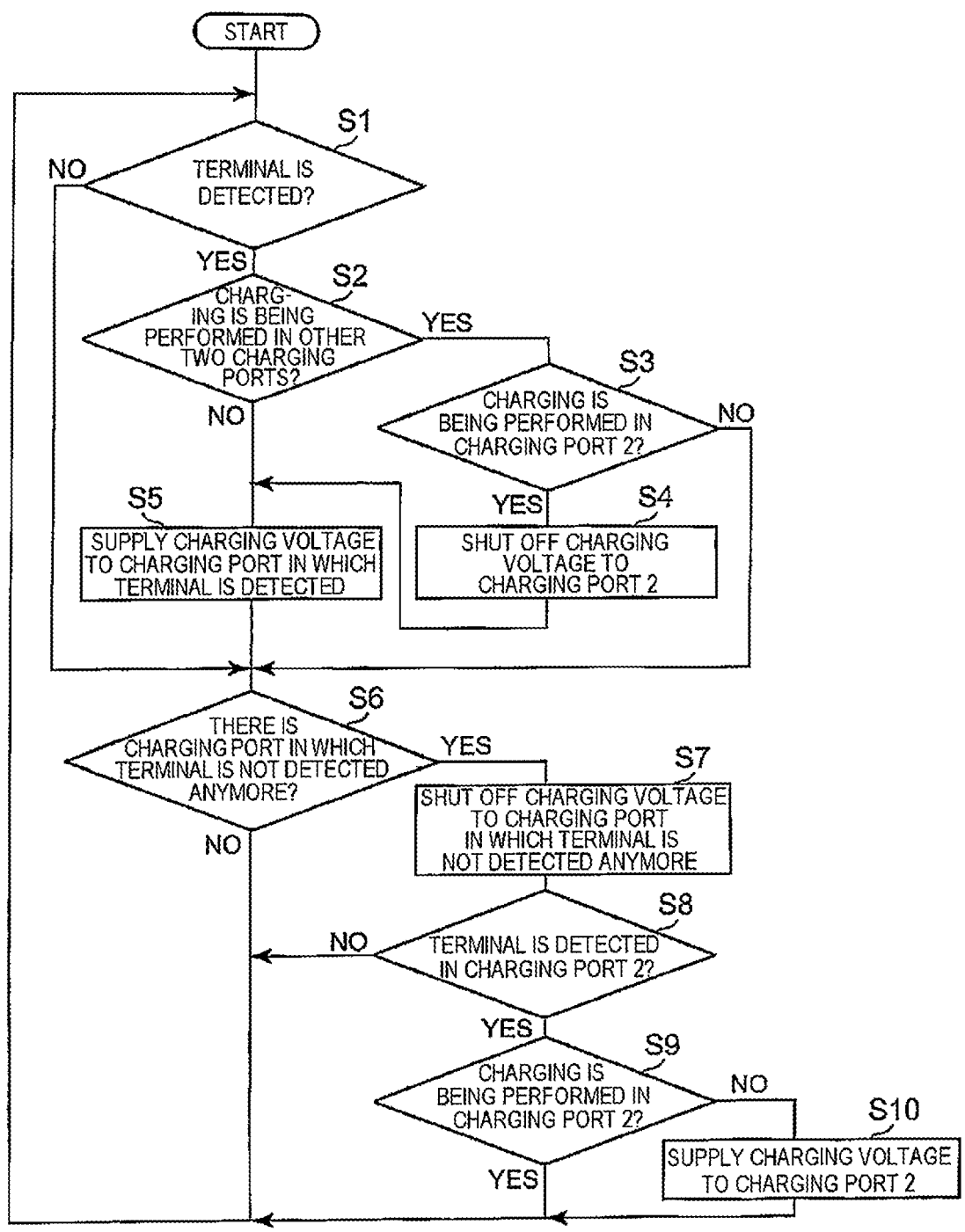
FIG. 17 is a flow chart for illustrating operation of the charging system for a portable terminal device according to the first embodiment of this invention.

Next, referring to FIG. 17 further, description is given of operation of the charging system, in particular, processing executed by the controller 102 of the charging stand 100.

The following description is common to the charging ports 1 to 3, but the charging port 2 has a different point from the charging ports 1 and 3, which is to be described later.

In Step S1 of FIG. 17, the controller 102 of the charging stand 100 determines whether or not the portable terminal device 600 is detected. When the portable terminal device 600 is detected (YES in Step S1), the processing proceeds to Step S2. On the other hand, when the portable terminal device 600 is not detected (NO in Step S1), the processing proceeds to Step S6.

In Step S2, the controller 102 of the charging stand 100 determines whether or not charging is being performed in two charging ports other than the charging port in which the portable terminal device 600 is detected. When charging is being performed in the other two charging ports (YES in Step S2), the processing proceeds to Step S3. On the other hand, when charging is not being performed in the other two charging ports (NO in Step S2), the processing proceeds to Step S5.

The case in which "charging is being performed in two charging ports other than the charging port in which the portable terminal device 600 is detected" refers to a case in which charging is being performed in both of the other two charging ports. The case in which "charging is not being performed in two charging ports other than the charging port in which the portable terminal device 600 is detected" refers to a case in which charging is not being performed in both of the other two charging ports, or a case in which charging is being performed in one of the other two charging ports whereas charging is not being performed in the other one of the other two charging ports.

The reason why it is determined whether or not charging is being performed in the two charging ports other than the charging port in which the portable terminal device 600 is detected is that the AC adapter 700, which is built in the charging stand 100, has a charging current supply capacity for only two portable terminal devices, that is, the AC adapter 700 is capable of charging only two portable terminal devices at the same time.

In Step S3, it is determined whether or not charging is being performed in the charging port 2. When charging is being performed in the charging port 2 (YES in Step S3), the processing proceeds to Step S4. On the other hand, when charging is not being performed in the charging port 2 (NO in Step S3), the processing proceeds to Step S6.

In Step S4, the charging voltage to the charging port 2 is shut off, and the processing proceeds to Step S5. That is, in Step S4, the portable terminal devices 600 are placed on both of the charging ports 1 and 2, and the charging port 3 is also mounted to the portable terminal device 600. That is, all of the charging ports 1 to 3 are occupied. In the first embodiment, the AC adapter 700 has a charging capacity for only two charging ports, and hence the charging voltage to the charging port 2 among the charging ports 1 to 3 is shut off so that charging of the portable terminal device 600 that is placed on the charging port 2 is stopped.

In Step S5, the charging voltage is supplied to the charging port in which the portable terminal device 600 is detected, and the processing proceeds to Step S6.

In Step S6, it is determined whether or not there is a charging port in which the portable terminal device 600 is not detected anymore. When there is a charging port in which the portable terminal device 600 is not detected anymore (YES in Step S6), the processing proceeds to Step S7. On the other hand, when there is no charging port in which the portable terminal device 600 is not detected anymore (NO in Step S6), the processing returns to Step S1.

In Step S7, the charging voltage supplied to a charging port in which the portable terminal device 600 is not detected anymore is shut off, and the processing proceeds to Step S8.

In Step S8, it is determined whether or not the portable terminal device 600 is detected in the charging port 2. When the portable terminal device 600 is detected in the charging port 2 (YES in Step S8), the processing proceeds to Step S9. On the other hand, when the portable terminal device 600 is not detected in the charging port 2 (NO in Step S8), the processing returns to Step S1.

In Step S9, it is determined whether or not the portable terminal device 600 is being charged in the charging port 2. When the portable terminal device 600 is being charged in the charging port 2 (YES in Step S9), the processing returns to Step S1. On the other hand, when the portable terminal device 600 is not being charged in the charging port 2 (NO in Step S9), the processing proceeds to Step S10.

In Step S10, the charging voltage is supplied to the charging port 2, and the processing returns to Step S1.

In the first embodiment described above, the charging stand 100 includes two charging ports 1 and 2, that is, the terminal mounting sections 112A and 112B, but the number of terminal mounting sections may be one. Alternatively, three or more terminal mounting sections may be included in the charging stand. In this case, the charging current supply capacity of the AC adapter 700 (charging current supply source) is set so that a charging current can be supplied to portable terminal devices of the number corresponding to the number of the terminal mounting sections. Together with this, there is set one charging port (charging port corresponding to the terminal mounting section 112A or 112B) to which the charging voltage is not supplied when portable terminal devices of the number of (number of the terminal mounting sections 112A and 112B+1) are detected.

According to the invention of the first embodiment, it is possible to provide the charging system for a portable terminal device, which enables the portable terminal device that is placed on the charging stand to be charged to be used while being charged. Further, according to the invention of the first embodiment, it is possible to charge the portable terminal device that is set to the charging cable with use of the AC adapter (charging current supply source) that has the charging current supply capacity only for portable terminal devices of the number of the portable terminal devices that can be placed on the charging stand.

Modification Example of First Embodiment

In a modification example of the first embodiment, the AC adapter (charging current supply source) may have a charging current supply capacity with which charging current can be supplied to at least all charging ports including the charging port of the charging cable.

Figure 18:
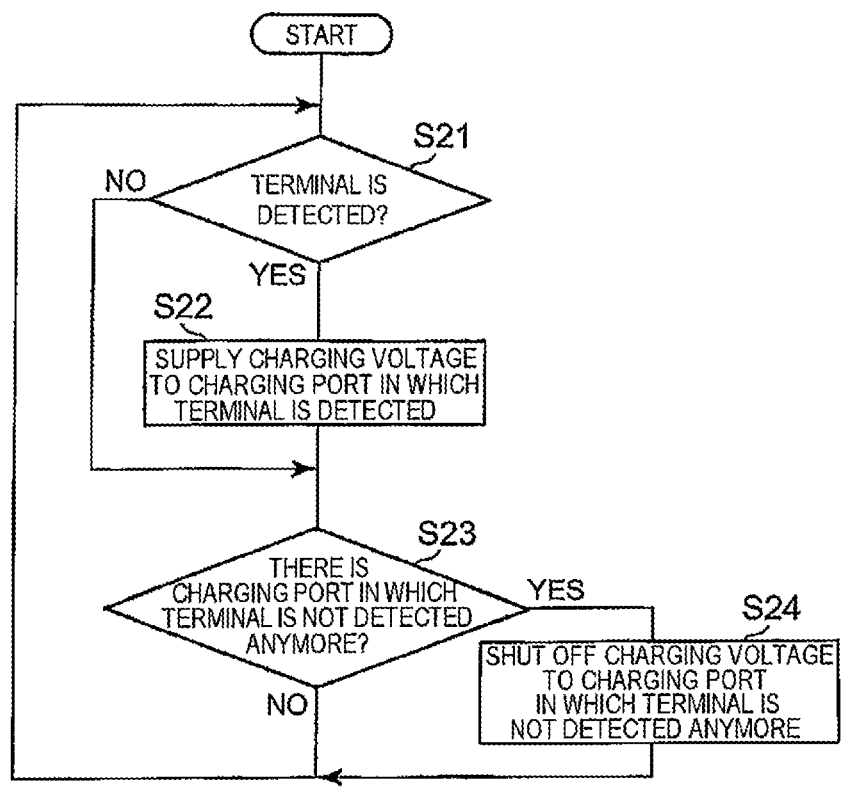
FIG. 18 is a flow chart for illustrating operation of the charging system for a portable terminal device according to a modification example of the first embodiment of this invention.

Now, referring to FIG. 15 as a reference and a flow chart of FIG. 18, description is given of an operation of the charging system for a portable terminal device in this modification example, in particular, processing executed by the controller of the charging stand.

In Step S21 of FIG. 18, the controller 102 of the charging stand 100 determines whether or not the portable terminal device is detected. When the portable terminal device is detected (YES in Step S21), the processing proceeds to Step S22. On the other hand, when the portable terminal device is not detected (NO in Step S21), the processing proceeds to Step S23.

In Step S22, the charging voltage is supplied to the charging port in which the portable terminal device is detected, and the processing proceeds to Step S23.

In Step S23, it is determined whether or not there is a charging port in which the portable terminal device is not detected anymore. When there is a charging port in which the portable terminal device is not detected anymore (YES in Step S23), the processing proceeds to Step S24. On the other hand, when there is no charging port in which the portable terminal device is not detected anymore (NO in Step S23), the processing returns to Step S21.

In Step S24, the charging voltage supplied to a charging port in which the portable terminal device is not detected anymore is shut off, and the processing returns to Step S21.

Second Embodiment

A second embodiment of this invention differs from the first embodiment in that the charging stand does not include the charging port 3 and the receptacle connector for connecting the charging cable thereto and that the charging cable charges the portable terminal device without interposition of the charging stand.

Also in the second embodiment, the charged terminals of the portable terminal device and the contact pins of the charging stand come into abutment with each other in a similar manner as that in the first embodiment, and the charged terminals of the portable terminal device and the contact pins of the terminal housing of the charging cable come into abutment with each other also in a similar manner as that in the first embodiment. Further, the portions of the charged terminals of the portable terminal device that come into abutment with the contact pins of the charging stand and the portions of the charged terminals of the portable terminal device that come into abutment with the contact pins of the terminal housing of the charging cable are the same.

Figure 19:
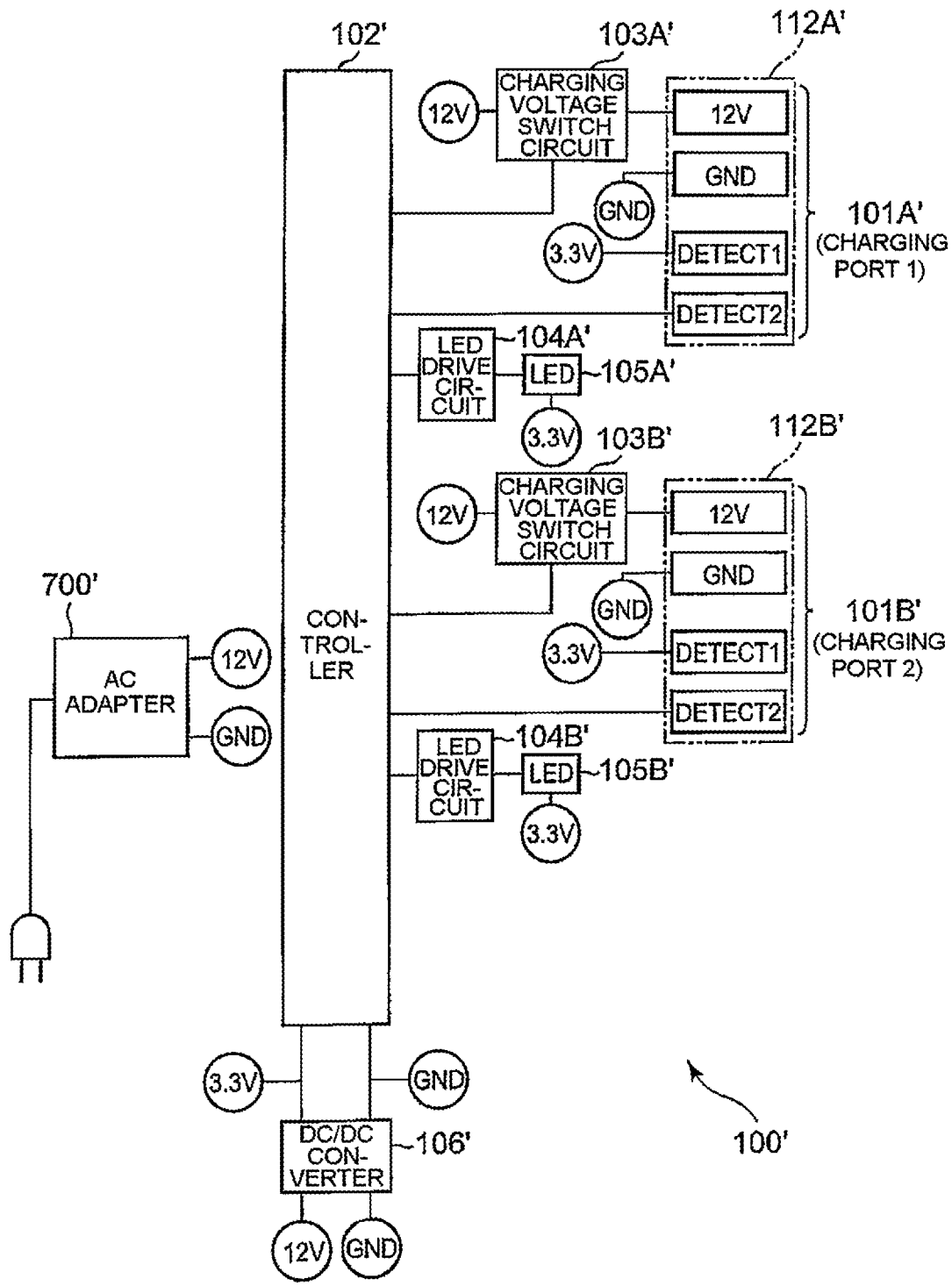
FIG. 19 is an electric circuit diagram of a charging stand in a charging system for a portable terminal device according to a second embodiment of this invention.
Figure 20:
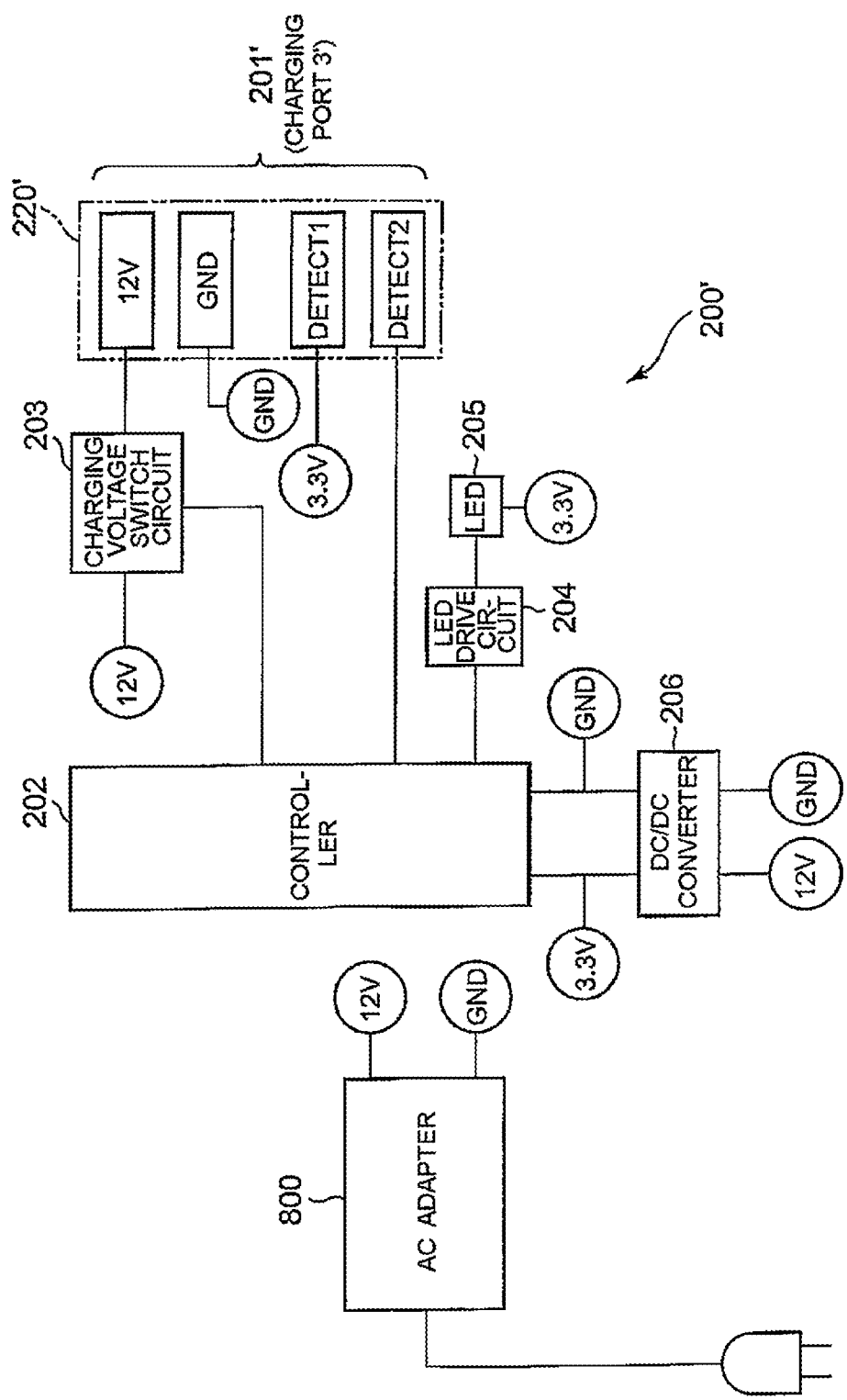
FIG. 20 is an electric circuit diagram of a charging cable for a portable terminal device according to the second embodiment of this invention.

Referring to FIG. 19 and FIG. 20, the charging system for a portable terminal device according to the second embodiment of this invention includes a charging stand 100' (FIG. 19) and a charging cable (FIG. 20).

Unlike the charging stand 100 in the first embodiment illustrated in FIG. 6 and FIG. 15, the charging stand 100' in the second embodiment does not include the charging port 3. That is, the charging stand 100' does not include the receptacle connector, the charging voltage switch circuit, the LED drive circuit, and the display portion (LED) for the charging port 3. Other configurations of the charging stand 100' are similar to those of the first embodiment, and hence detailed description thereof is omitted.

As illustrated in FIG. 19, the charging stand 100' includes the charging ports 1 and 2. The charging ports 1 and 2 correspond to terminal mounting sections 112A' and 112B' including contact pins (stand charging terminals) 101A' and 101B' as in the first embodiment, respectively. Shapes and configurations of the charging stand 100', the terminal mounting sections 112A' and 112B', and the contact pins 101A' and 101B' are the same as those of the charging stand, the terminal mounting sections, and the contact pins in the first embodiment, and hence FIG. 1, FIG. 6, FIG. 10, FIG. 11, FIG. 14, and the like are referred to as references. An AC adapter 700', which is connected to a commercial power supply (not shown), converts AC 100 V into DC 12 V. A DC/DC converter 106' converts DC 12 V into DC 3.3 V.

The contact pins 101A' and 101B' of the charging ports 1 and 2 each include the terminals of "12V", "GND", "DETECT1", and "DETECT2".

The terminal "12V" and the terminal "GND" in each of the contact pins 101A' and 101B' are supplied with the charging voltage. A controller 102' of the charging stand 100' controls charging voltage switch circuits 103A' and 103B' to turn on and off the charging voltage of 12 V.

The terminal "DETECT1" and the terminal "DETECT2" in each of the contact pins 101A' and 101B' are used for detecting the portable terminal device 600 as illustrated in FIG. 7 to FIG. 9, for example. The terminal "DETECT1" is supplied with a voltage of 3.3 V. Meanwhile, the terminal "DETECT1" and the terminal "DETECT2" of the charged terminals 601 (FIG. 8(*c*)) of the portable terminal device 600 are electrically conducted inside the portable terminal device 600. Thus, when the portable terminal device 600 is placed onto the terminal mounting section 112A' or 112B' of the charging stand 100', a voltage of 3.3 V at the terminal "DETECT1" is output to the terminal "DETECT2" in the contact pins 101A' or 101B'.

Further, when a voltage of a High level (3.3 V) is detected at the terminal "DETECT2", at which the voltage is normally at a Low level, the controller 102' of the charging stand 100' determines that the portable terminal device 600 is detected, and turns on the charging voltage switch circuit 103A', or 103B' to supply the charging voltage. Together with this, the controller 102' controls an LED drive circuit 104A' or 104B' to cause an LED 105A' or 105B' to emit light.

When the voltage of the High level (3.3 V) is not detected anymore at the terminal "DETECT2", the controller 102' determines that the portable terminal device 600 is not detected anymore, and turns off the charging voltage switch circuit 103A' or 103B' to shut off the charging voltage. Together with this, the controller 102' controls the LED drive circuit 104A' or 104B' to cause the LED 105A' or 105B' to stop emitting light.

Next, referring to FIG. 18 (flow chart of the modification example of the first embodiment) as a reference and FIG. 19, description is given of operation of the charging stand 100' in the second embodiment of this invention, in particular, processing executed by the controller 102'.

In Step S21 of FIG. 18, the controller 102' of the charging stand 100' determines whether or not the portable terminal device is detected. When the portable terminal device is detected (YES in Step S21), the processing proceeds to Step S22. On the other hand, when the portable terminal device is not detected (NO in Step S21), the processing proceeds to Step S23.

In Step S22, the charging voltage is supplied to the charging port in which the portable terminal device is detected, and the processing proceeds to Step S23.

In Step S23, it is determined whether or not there is a charging port in which the portable terminal device is not detected anymore. When there is a charging port in which the portable terminal device is not detected anymore (YES in Step S23), the processing proceeds to Step S24. On the other hand, when there is no charging port in which the portable terminal device is not detected anymore (NO in Step S23), the processing returns to Step S21.

In Step S24 the charging voltage supplied to a charging port in which the portable terminal device is not detected anymore is shut off, and the processing returns to Step S21.

FIG. 20 is a diagram for illustrating a circuit configuration of the charging cable 200' according to the second embodiment. An AC adapter 800 converts AC 100 V into DC 12 V. A DC/DC converter 206 converts DC 12 V into DC 3.3 V.

As illustrated in FIG. 20, the charging cable 200' includes a single charging port 3'.

The charging port 3' corresponds to a terminal housing 220' including contact pins (cable charging terminals) 201'. Shapes and configurations of the terminal housing 220' and the contact pins 201' are the same as those of the terminal housing and the contact pins in the first embodiment, and hence FIG. 1 to FIG. 5, FIG. 12 to FIG. 14, and the like are referred to as references.

Similarly to the first embodiment, inside the terminal housing 220', a magnet is mounted as an attracting portion.

The charging port 3' includes the terminals of "12V", "GND", "DETECT1", and "DETECT2".

The terminal "12V" and the terminal "GND" in the contact pins 201' are supplied with the charging voltage. A controller 202 of the charging cable 200' controls a charging voltage switch circuit 203 to turn on and off the charging voltage of 12 V.

The terminal "DETECT1" and the terminal "DETECT2" in the contact pins 201' are used for detecting the portable terminal device 600 as illustrated in FIG. 7 to FIG. 9, for example. The terminal "DETECT1" is supplied with a voltage of 3.3 V Meanwhile, the terminal "DETECT1" and the terminal "DETECT2" of the charged terminals 601 (FIG. 8(*c*)) of the portable terminal device 600 are electrically conducted inside the portable terminal device 600. Thus, when the terminal housing 220' of the charging cable 200' is mounted to the portable terminal device 600, a voltage of 3.3 V at the terminal "DETECT1" is output to the terminal "DETECT2" in the contact pins 201'.

Further, when a voltage of a High level (3.3 V) is detected at the terminal "DETECT2", at which the voltage is normally at a Low level, the controller 202 of the charging cable 200' determines that the portable terminal device 600 is detected, and turns on the charging voltage switch circuit 203 to supply the charging voltage. Together with this, the controller 202 controls an LED drive circuit 204 to cause an LED 205 to emit light.

When the voltage of the High level (3.3 V) is not detected anymore at the terminal "DETECT2", the controller 202 determines that the portable terminal device 600 is not detected anymore, and turns off the charging voltage switch circuit 203 to shut off the charging voltage. Together with this, the controller 202 controls the LED drive circuit 204 to cause the LED 205 to stop emitting light.

Figure 21:
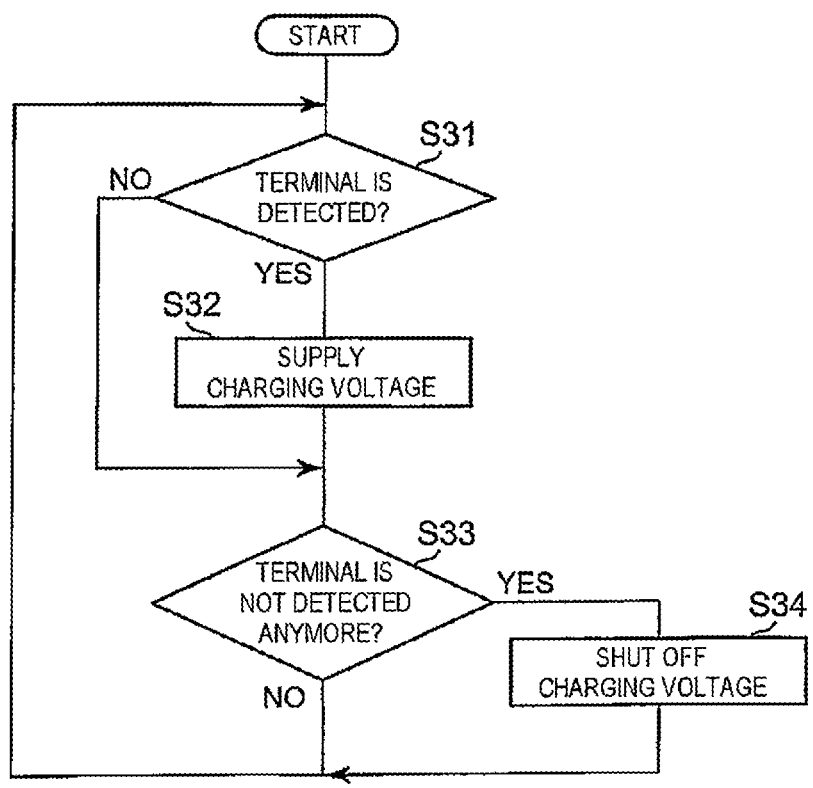
FIG. 21 is a flow chart for illustrating operation of the charging cable for a portable terminal device according to the second embodiment of this invention.

Next, referring to FIG. 20 and FIG. 21, description is given of operation of the charging cable 200' in the second embodiment of this invention, in particular, processing executed by the controller 202.

In Step S31 of FIG. 21, the controller 202 of the charging cable 200' determines whether or not the portable terminal device is detected in the charging port 3'. When the portable terminal device is detected (YES in Step S31), the processing proceeds to Step S32. On the other hand, when the portable terminal device is not detected (NO in Step S31), the processing proceeds to Step S33.

In Step S32, the charging voltage is supplied to the charging port 3' in which the portable terminal device is detected, and the processing proceeds to Step S33.

In Step S33, it is determined whether or not the portable terminal device is not detected anymore in the charging port 3'. When the portable terminal device is not detected anymore (YES in Step S33), the processing proceeds to Step S34. On the other hand, when the portable terminal device is being detected (NO in Step S33), the processing returns to Step S31.

In Step S34, the charging voltage supplied to the charging port 3' in which the portable terminal device is not detected anymore is shut off, and the processing returns to Step S31.

In the second embodiment, the charging stand 100' includes two terminal mounting sections 112A' and 112B', but the charging stand 100' may include one terminal mounting section or three or more terminal mounting sections.

According to the invention of the second embodiment, it is possible to provide the charging system for a portable terminal device, which enables the portable terminal device that is placed on the charging stand to be charged to be used while being charged.

This invention is not limited to the above-mentioned embodiments.

For example, in the first embodiment, the modification example of the first embodiment, and the second embodiment, the magnet is provided in the terminal housing of the charging cable as the attracting portion whereas the metal plate is provided in the portable terminal device as the attracted portion. However, a metal plate may be provided in the terminal housing of the charging cable as an attracting portion whereas a magnet is provided in the portable terminal device as an attracted portion. Alternatively, a magnet may be provided in the terminal housing of the charging cable as an attracting portion whereas a magnet is provided also in the portable terminal device as an attracted portion. In this case, magnetic poles are arranged so that a magnetic force with which the magnets are attracted to each other is generated. That is, the magnet in the portable terminal device and the magnet in the terminal housing are arranged so that an N-pole of the magnet in the portable terminal device and an S-pole of the magnet in the terminal housing are opposed to each other or an S-pole of the magnet in the portable terminal device and an N-pole of the magnet in the terminal housing are opposed to each other.

Further, in the first embodiment, the modification example of the first embodiment, and the second embodiment, the stand charging terminals and the cable charging terminals are contact pins. However, the stand charging terminals and/or the cable charging terminals may be terminals having a flat spring shape.

REFERENCE SIGNS LIST 100, 100' charging stand
101A, 101B, 101A', 101B' contact pin (stand charging terminal)
101C receptacle connector
102, 102' controller
103A, 103B, 103C, 103A', 103B' charging voltage switch circuit
104A, 104B, 104C, 104A', 104B' LED drive circuit
105A, 105B, 105C, 105A', 105B' display portion (LED)
106, 106' DC/DC converter
112A, 112B, 112A', 112B' terminal mounting section
114A, 114B guide projection portion
115A, 115B guide end portion
200, 200' charging cable
201, 201' contact pin (cable charging terminal)
202 controller
203 charging voltage switch circuit
204 LED drive circuit
205 display portion (LED)
206 DC/DC converter
210 cable portion
220, 220' terminal housing
221a base portion
221b upright portion
221c rear cover
221d bottom cover
222 abutment surface
223 rib
224 guide projection portion
225 locking projection portion
226 magnet
230 plug connector
600 portable terminal device
600r rear panel
600td display including touch panel
601 charged terminal
604 terminal-adjacent recessed portion
605 rear surface recessed portion
606 metal plate
700, 700', 800 AC adapter

The invention claimed is:

1. A charging system for a portable terminal device, comprising:
a charging stand, on which the portable terminal device is to be removably mounted; and
a charging cable, which is to be removably mounted to the portable terminal device,
the charging stand including:
a terminal mounting section, on which the portable terminal device is to be mounted; and
a stand charging terminal, which is configured to come into abutment with a charged terminal of the portable terminal device mounted on the terminal mounting section, to thereby charge the portable terminal device,
wherein the charging cable includes a cable charging terminal, which is configured to come into abutment with the charged terminal of the portable terminal device, and the charging cable is to be removably connected to the charging stand, and is configured to supply power to the cable charging terminal via the charging stand, to thereby charge the portable terminal device,
wherein an arrangement and sequence of the cable charging terminal and an arrangement and sequence of the stand charging terminal of the charging stand are the same,
wherein the cable charging terminal and the stand charging terminal are contact pins which are the same in shape and size as each other,
wherein the contact pins are capable of moving with elasticity with which the contact pins are capable of returning to original positions thereof, so that upper ends of the contact pins sink from their original positions when force is applied from above, and the upper ends return to their original positions when the force is removed,
wherein a movable range of the cable charging terminal when the charging cable is mounted to the portable terminal device is equal to a movable range of the stand charging terminal when the portable terminal device is mounted to the charging stand,
wherein the charging cable further includes a terminal housing, which includes the cable charging terminal, and is to be removably mounted to the portable terminal device, wherein the terminal housing includes an attracting portion, which is configured to attract an attracted portion provided in the portable terminal device so that the terminal housing is maintained in a mounted state when the terminal housing is mounted to the portable terminal device, and wherein the attracting portion includes a magnet when the attracted portion in the portable terminal device includes a metal plate, or includes a metal plate or a magnet when the attracted portion in the portable terminal device includes a magnet, and wherein the charging stand is configured to stop supplying power to the stand charging terminal and to supply power to the cable charging terminal of the charging cable when the charging cable mounted to the portable terminal device is connected to the charging stand and in a case where the portable terminal device is mounted to the terminal mounting section.

2. The charging system for a portable terminal device according to claim 1, wherein the terminal housing includes:
  a base portion provided with the cable charging terminal; and
  an upright portion provided upright from the base portion and has an abutment surface configured to come into abutment with a rear surface of the portable terminal device, wherein the attracting portion is provided on the upright portion, wherein the attracted portion is provided on a rear surface of the portable terminal device, wherein the charged terminal is provided on a bottom surface of the portable terminal device, wherein the portable terminal device is provided with a rear surface recessed portion formed on the rear surface thereof, and wherein the upright portion is provided with a locking projection portion, which is configured to be engaged with the rear surface recessed portion when the terminal housing is mounted to the portable terminal device so as to prevent the terminal housing from shifting along the rear surface of the portable terminal device to come off the portable terminal device.

3. The charging system for a portable terminal device according to claim 1, wherein the charging stand includes a plurality of the terminal mounting sections and a plurality of the stand charging terminals.

4. The charging system for a portable terminal device according to claim 2, wherein the charging stand includes a plurality of the terminal mounting sections and a plurality of the stand charging terminals.

* * * * *